/

US007051332B2

(12) United States Patent
Gatto et al.

(10) Patent No.: US 7,051,332 B2
(45) Date of Patent: May 23, 2006

(54) CONTROLLER HAVING A RESTART ENGINE CONFIGURED TO INITIATE A CONTROLLER RESTART CYCLE UPON RECEIPT OF A TIMEOUT SIGNAL FROM A WATCHDOG TIMER

(75) Inventors: Jean-Marie Gatto, London (GB); Thierry Brunet De Courssou, Palo Alto, CA (US)

(73) Assignee: Cyberscan Technology, Inc., Palo Alto, CA (US)

( * ) Notice: Subject to any disclaimer, the term of this patent is extended or adjusted under 35 U.S.C. 154(b) by 778 days.

(21) Appl. No.: 09/861,850

(22) Filed: May 21, 2001

(65) Prior Publication Data

US 2002/0174160 A1   Nov. 21, 2002

(51) Int. Cl.
*G06F 9/46* (2006.01)
(52) U.S. Cl. .................................... 718/108; 718/100
(58) Field of Classification Search ........ 711/100–173; 713/100–189; 718/108, 100
See application file for complete search history.

(56) References Cited

U.S. PATENT DOCUMENTS

| 4,465,901 | A |   | 8/1984  | Best            |         |
|-----------|---|---|---------|-----------------|---------|
| 4,558,176 | A |   | 12/1985 | Arnold et al.   |         |
| 4,847,902 | A |   | 7/1989  | Hampson         |         |
| 5,450,576 | A | * | 9/1995  | Kennedy         | 713/2   |
| 5,701,516 | A | * | 12/1997 | Cheng et al.    | 710/22  |
| 5,905,521 | A |   | 5/1999  | Gatto           |         |
| 5,960,411 | A |   | 9/1999  | Hartman         |         |
| 5,982,887 | A |   | 11/1999 | Hirotani        |         |
| 6,073,118 | A |   | 6/2000  | Gormish et al.  |         |
| 6,118,860 | A |   | 9/2000  | Hillson         |         |
| 6,233,565 | B1|   | 5/2001  | Lewis           |         |
| 6,308,256 | B1|   | 10/2001 | Folmsbee        |         |
| 6,347,307 | B1|   | 2/2002  | Sandhu et al.   |         |
| 6,389,402 | B1|   | 5/2002  | Ginter et al.   |         |
| 6,397,301 | B1|   | 5/2002  | Quach et al.    |         |
| 2001/0018736 | A1 | * | 8/2001 | Hashimoto et al. | 713/1 |
| 2001/0047489 | A1 |   | 11/2001 | Ito et al.      |         |

OTHER PUBLICATIONS

Schneier, Bruce, *Secrets and Lies, Digital Security In A Networked World*, Ch. 20, pp. 307-317, John Wiley & Sons, Inc., 2000.
Intel (R) Security Program: Intel (R) Random Number Generator (RNG), *Intel Random Number Generator: Hardware Support That Helps Improve A Range Of Security Technologies*, p. 1, //developer.intel/com/design/security/rng/rng.htm (Printed on Jan. 31, 2001).

(Continued)

Primary Examiner—Meng-Al T. An
Assistant Examiner—Kenneth Tang
(74) Attorney, Agent, or Firm—Young Law Firm, P.C.

(57) ABSTRACT

An electronic controller for conducting trusted lightweight e-commerce transactions. A trusted transactional cache and the associated transactional protocol allow e-commerce transactions to be committed to a remote server extremely quickly and with little network overhead. The end-to-end transactions are completed is just a few seconds or less. The invention operates equally well on robust private networks as on unpredictable Internet or wireless networks. The transaction is automatically completed following a temporary communication failure with the central site or following a temporary local controller failure. The invention can advantageously be used in embedded Internet products such as fixed or mobile Internet kiosks, transactional terminals, and Internet Appliances.

14 Claims, 19 Drawing Sheets

OTHER PUBLICATIONS

Microsoft Passport: A Single Name, Password and Wallet For The Web! *Microsoft Passport: One Name. One Password*, pp. 1-2, .passport.com/Consumer/Default.asp?Plcid=1033 (Printed on Mar. 19, 2001).

Simtek Corporation, *Simtek: Memory Like A Steel Trap—World's Fastest Reprogrammable Nonvolatile Memories*, p. 1, .simtek.com/ (Printed on Jan. 31, 2001).

Simtek, *nvSRAM Basics*, pp. 8-1 through 8-6.

Your Home Expert—Honeywell's Webpad, *New Version Honeywell WebPAD II Internet Appliance*, pp. 1, World Wide Web, content.honeywell.com/Home/webpad/webpad.htm (Printed on May 2, 2001).

Silicon Image, *Silicon Image All Digital—No Limits, Products, Features Overview*, pp. 1-2, World Wide Web, siimage.com/products/overview_sii861.asp (Printed on May 3, 2001).

Schneier, Bruce, *Secrets and Lies: Digital Security In A Networked World*, Ch. 6, pp. 85-101, John Wiley & Sons, Inc., 2000.

Schneier, Bruce, *Secrets and Lies, Digital Security In A Networked World*, Ch. 7, pp. 102-119, John Wiley & Sons, Inc., 2000.

Schneier, Bruce, *Secrets and Lies, Digital Security In A Networked World*, Ch. 20, pp. 307-317, John Wiley & Sons, Inc., 2000.

Intel (R) Security Program: Intel (R) Random Number Generator (RNG), *Intel Random Number Generator: Hardware Support That Helps Improve A Range Of Security Technologies*, p. 1, //developer.intel.com/design/security/rng/rng.htm (Printed on Jan. 31, 2001).

Microsoft Passport: A Single Name, Password and Wallet For The Web! *Microsoft Passport: One Name. One Password*, pp. 1-2, passport.com/Consumer/Default.asp?Plcid=1033 (Printed on Mar. 19, 2001).

Simtek Corporation, *Simtek: Memory Like A Steel Trap—World's Fastest Reprogrammable Nonvolatile Memories*, p. 1, simtek.com/ (Printed on Jan. 31, 2001).

Supplemental European Search Report dated Oct. 26, 2005, in related European Patent Application No. 02726946.3 (3pgs).

* cited by examiner

CONTROLLER HAVING A RESTART ENGINE CONFIGURED TO INITIATE A CONTROLLER RESTART CYCLE UPON RECEIPT OF A TIMEOUT SIGNAL FROM A WATCHDOG TIMER

CROSS-REFERENCE TO RELATED APPLICATIONS

This application is related to co-pending and commonly assigned application Ser. No. 09/862,165, filed May 21, 2001, and application Ser. No. 09/862,036, filed May 21, 2001, both applications of which are hereby incorporated herein by reference in their entirety.

BACKGROUND OF THE INVENTION

1. Field of the Invention

The invention generally pertains to the field of electronic commerce and the merging of technology and personal services.

2. Description of the Related Art

Electronic commerce (e-commerce) is traditionally practiced using a Web browser running on a personal computer (PC) connected to the Internet. Although online goods and services providers can offer attractive, practical, efficient and reliable e-commerce via the Internet, a typical end-to-end e-commerce transaction can take several minutes to complete.

Moreover, existing e-commerce methods can leave the consumer wondering whether the online transaction was successfully completed. At times, the consumer may not be certain that the online transaction was successfully completed until the goods actually show up at the door. A good practice is for the e-commerce provider to send an acknowledgment of the consumer's order by email, the email containing all of the details needed to allow the user to check the current status of the order. E-commerce sites such as Amazon.com have refined the process in order to provide an excellent quality of service that almost everyone has come to appreciate and trust. For example, the "1-click" purchase model patented by Amazon.com considerably speeds up the purchase of items for already registered users, and the user need not wait online for a confirmation that the credit card payment was accepted. Moreover, easy account access allows the user to check the status of a pending order and the status of the delivery. Every change made either by the user or by the provider is automatically acknowledged in an email message posted to the user.

Removing the issue of bad or non-payment, such a transactional model for executing an online transaction is essentially biased in favor of the provider, in that the provider always knows whether the purchase request is valid or is invalid. In contrast, the shopper may have doubts as to the success of his or her purchase request until such time as an explicit acknowledgment is provided, which may not occur until a quite a significant time after the online order has been submitted. Typically, the acknowledgment is supplied as a displayed message, a printed receipt or an email. This is because e-commerce servers are not optimized to provide an instantaneous acknowledgment, especially when a clearing bank is involved in validating a credit card purchase.

Consequently, because of the lack of a reliable, speedy and trusted e-commerce transactional model, consumer-oriented Internet appliances optimized to carry out e-commerce are quasi-inexistent.

SUMMARY OF THE INVENTION

It is, therefore, an object of the present invention to provide a robust, speedy and trusted e-commerce transactional model. It is another object of the present invention to provide a trusted transactional controller that will enable the development of Internet appliances for the mass consumer market that are optimized for e-commerce.

Another object of the present invention, therefore, is to offer a method for conducting trusted lightweight e-commerce transactions whereby the e-commerce transaction is performed in seconds or even mere fractions of a second. In this manner, the user need not be concerned by the possible failure of the transaction commitment to the e-commerce remote server.

As wireless networking is rapidly developing because of the convenience that it brings, it is a further object of the invention to offer a robust transactional method that is not affected by temporary communication outages that may occur frequently due to uncontrolled Radio Frequency (RF) noise sources.

In accordance with the above-described objects and those that will be mentioned and will become apparent below, a controller for controlling a device, includes a processor adapted to execute a program, and a trusted cache, the trusted cache being coupled to the processor and including: a nonvolatile memory; a context data save engine adapted to selectively save the context of the program to the nonvolatile memory, and a context data recovery engine adapted to recover the saved context from the nonvolatile memory, the processor being adapted continue execution of the program from the recovered saved context of the program upon failure of one of the controller, the program and the host device.

The processor and the trusted cache may be formed together on a single chip integrated circuit, disposed on a single piece hybrid circuit or disposed on a single electronic board, for example. The controller may further include a hardware random number generator coupled to the processor, the hardware random number generator being configured to provide the processor with random encryption keys or random numbers. The trusted cache may further include a watchdog timer, the watchdog timer being configured to timeout and generate an alert signal unless periodically reset. The controller may also include a restart engine configured to initiate a controller restart cycle upon receiving the alert signal. The restart engine may be configured to initiate a three phase controller restart cycle comprising a software reboot cycle, a hardware reset cycle and a power off cycle, the hardware reset cycle only being initiated upon failure of the software reboot cycle and the power off cycle only being initiated upon failure of the hardware reset cycle. The controller may also include a hardware random number generator. The processor, the trusted cache and the hardware random number generator may be formed together on a single chip integrated circuit, disposed on a single piece hybrid circuit or disposed on a single electronic board, for example.

The present invention is also a method of securely executing a software program, comprising the steps of retrieving a timeout value and a secret key from an entry in a table; setting a counter to the timeout value and starting the counter; receiving a secret key provided by the software program; determining whether the secret key retrieved from the table matches the secret key received from the software program, and terminating an execution of the software program if the counter indicates that the timeout value has been exceeded or if the secret key retrieved from the table does not match the secret key received from the software program.

A step of returning to the retrieving step may also be carried out to retrieve a timeout value and a secret key from a next entry in the table. The method may also include a step of allowing the software program to continue execution if the secret key retrieved from the table matches the secret key received from the software program and the timeout value has not been exceeded. The secret key retrieved from the table and received from the software program may be encrypted and the determining step may include a step of decrypting the secret keys retrieved from the table and received from the software program. The terminating step may include a step of cutting a power off from and returning power to a hardware executing the software program. The software program may be divided into a plurality of execution sequences, each of the execution sequences being divided by a checkpoint at which the secret key is provided. Execution of each execution sequence may be contingent upon a timely provision of the secret key at the preceding checkpoint.

The present invention is also a method of carrying out an online transaction between a user device and a remote server over a network. The method may include steps of initiating a user transaction at the user device; storing a copy of the user transaction in a trusted cache memory within the user device; sending the user transaction to the remote server under a control of the user device, and carrying a receiving step to receive a confirmed acknowledgment of the user transaction from the remote server and providing the confirmed acknowledgment or a generating step to generate a provisional acknowledgment of the user transaction from the stored copy of the user transaction in the trusted cache if the confirmed acknowledgment is not received within a predetermined period of time.

The method may also include a step of receiving the confirmed acknowledgment from the remote server after the predetermined period of time and storing the received confirmed acknowledgment in the trusted cache. A step of providing the stored confirmed acknowledgment upon request from a user of the user device may also be carried out. A step of re-sending the copy of the user transaction stored in the trusted cache to the remote server may be carried out upon failure to receive the confirmed acknowledgment from the remote server. The re-sending step may be carried out until a confirmed acknowledgment of the user transaction is received from the remote server. The re-sending step may be carried out a predetermined number of times. The generating step may include a step of printing the provisional acknowledgment together with corresponding machine-readable indicia that uniquely identifies the user transaction. The generating step may include a step of printing the provisional acknowledgment together with machine-readable indicia uniquely identifying the user transaction and the method may further include a step of reading the machine-readable indicia and providing the stored confirmed acknowledgment that corresponds to the read machine-readable indicia. The stored confirmation acknowledgment providing step may include a step of printing the confirmation acknowledgment.

DESCRIPTION OF THE INVENTION

Figure 1:
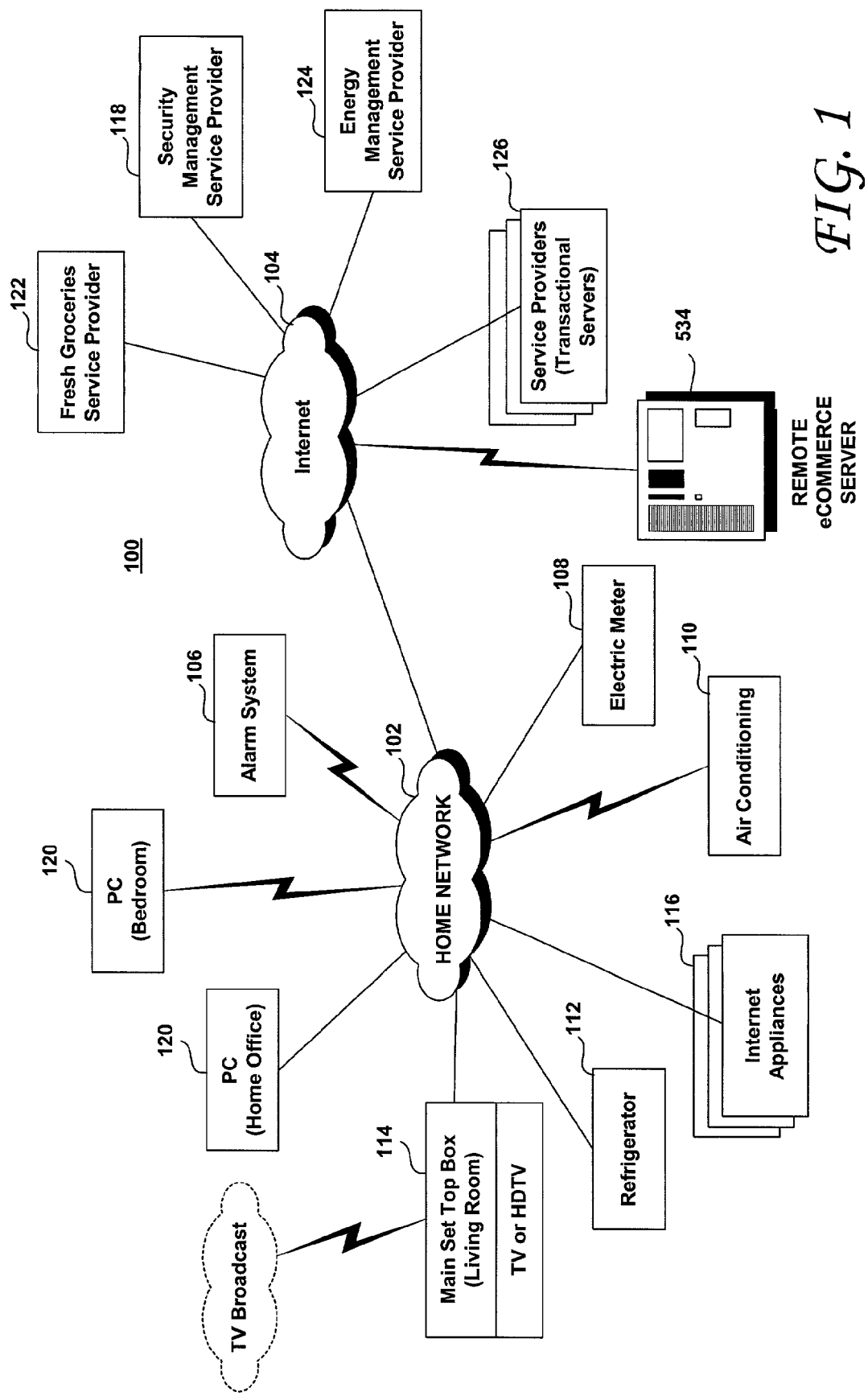
FIG. 1 is a diagram of a connected universe suitable for a Trusted Transaction Controller (TTC) according to an embodiment of the present invention.

FIG. 1 is a diagram of a universe 100 of interconnected devices suitable for a Trusted Transaction Controller (TTC) according to an embodiment of the present invention. A TTC, according to the present invention may operate within a universe 100 of interconnected devices such as a home network 102 and/or the Internet 104, a factory network, a small business network or a large enterprise network, for example. In a home network 102, for example, a TTC according to the present invention may be found integrated in an alarm system 106, a meter, such as a gas meter or an electricity meter 108, an air-conditioning system 110, a refrigerator 112, a television set-top box 114, a lighting management system (controlling the lights for mood, occupancy, etc.), a window management system (providing motorized shutters and curtains, motorized air vents, etc.), within kitchen (may be Internet-connected) appliances 116 such as a microwave oven, coffee maker, toaster and the like, within a security system 106, and/or a grounds watering system, to name a few applications.

In addition, the TTC according to the present invention may coexist in a home network 102 that includes personal computers 120 having Internet access to a variety of service providers such as online grocers 122, security service providers 118, energy management service providers 124 and/or other service providers, collectively referenced by numeral 126.

Figure 2:
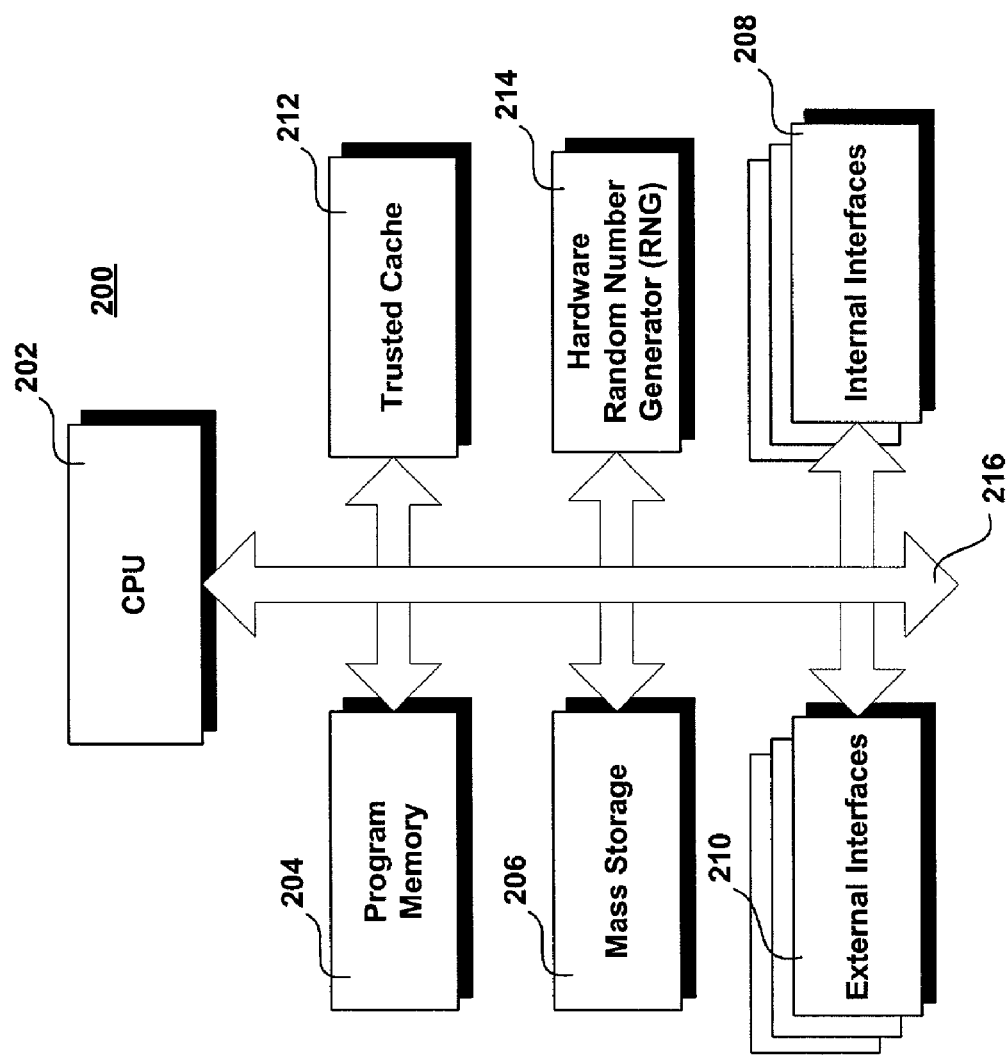
FIG. 2 is a diagram of a device employing a TTC, according to the present invention.

FIG. 2 is a block diagram of a TTC, according to an embodiment of the present invention. As shown, the TTC 200 may include a CPU 202, memory 204 (such as Static Random Access Memory—SRAM or Dynamic Random Access Memory—DRAM, for example) to execute a program and to store working data, mass storage 206 such as hard disk or flash memory for example, internal interfaces 208 such as graphics controller and communication controllers for example, external interfaces 210 such as a display monitor, mouse, keyboard for example, a trusted cache 212 to automatically recover from a temporary failure and a hardware Random Number Generator (RNG) 214 for generating true random numbers for maximum entropy encryption keys. Each of the elements 202, 204, 206, 208, 210, 212 and 214 are advantageously coupled to one another via a common bus structure, as shown at reference 216.

Figure 3:
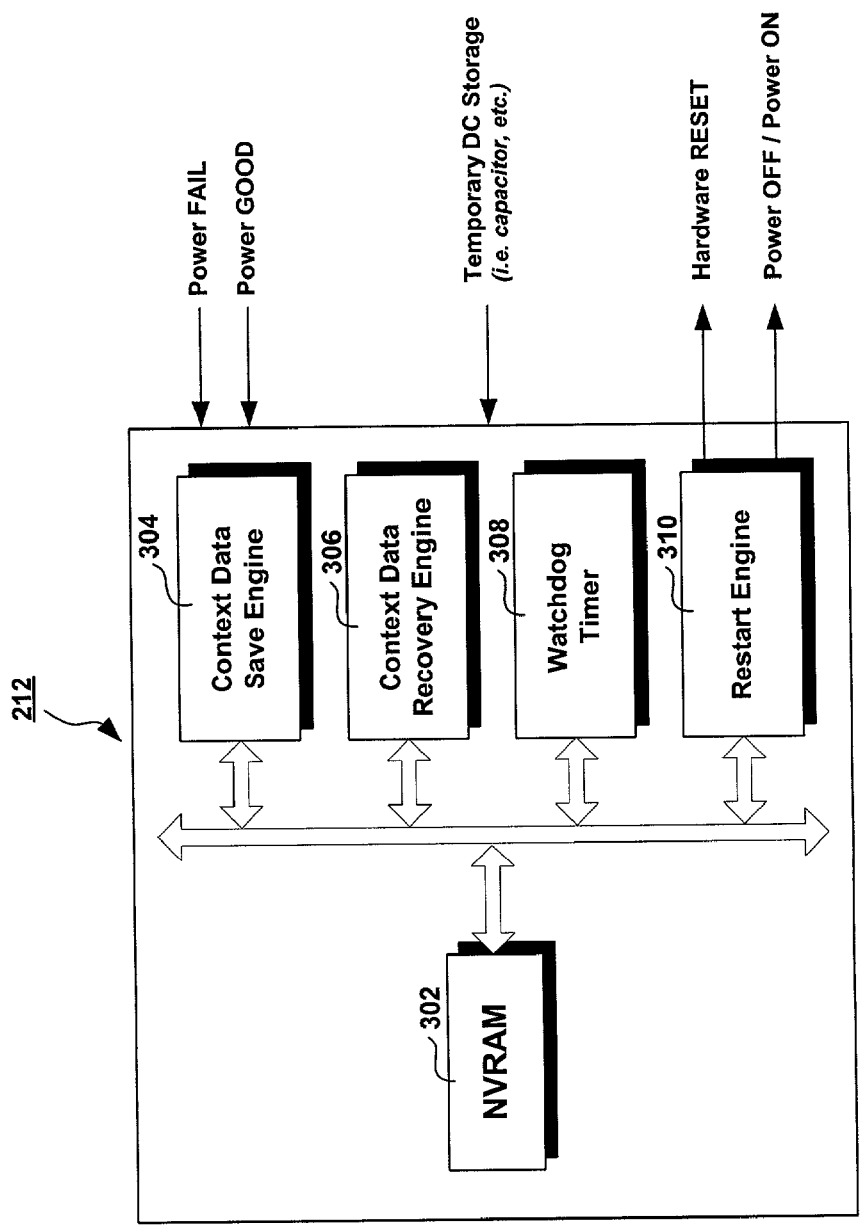
FIG. 3 is a diagram of a trusted cache, according to an embodiment of the present invention.

FIG. 3 is a diagram of a trusted cache 212, according to an embodiment of the present invention. As shown, the trusted cache 212 of the present invention may include a Non-Volatile Random Access Memory (NVRAM) 302 such as a "battery backed up" static memory or "Flash backed up" static memory (for example). Suitable memories for the NVRAM 302 are available from Simtek Corporation (www.simtek.com). The trusted cache 212 may also include a Context Data Save Engine 304 that is adapted to save the state and context of the current transaction being executed from the program memory 204 (Dynamic or Static RAM) into the NVRAM 302 as soon as power failure is sensed. A Context Data Recovery Engine 306 restores the transaction execution context from NVRAM 302 back into the DRAM or SRAM 204 as soon as the power supply is properly restored. A watchdog timer 308 may also be included in the trusted cache 212, the watchdog timer 308 being regularly reset as long as the executing software runs properly. If a time-out occurs, however, the watchdog timer 308 will alert the restart engine 310. The restart engine 310, according to an embodiment of the present invention, may then enter a recovery cycle (such as a three-stage recovery cycle, for example) as soon as an alert is received from the watchdog timer 308. The restart engine 310 may be configured to store state information of timing operations and to drive a power ON signal even when the main power is cut or removed, using electrical energy supplied by a temporary DC storage device such as a capacitor or a small battery. The invention is particularly well adapted to offer automatic recovery after temporary failure of the device containing the TTC of the present invention. Indeed, when the watchdog timer 308 is not timely reset by a normally executing program, the restart engine 310 may enter a predetermined recovery cycle, such as the 3-stage system recovery cycle illustrated in FIG. 4.

Figure 4:
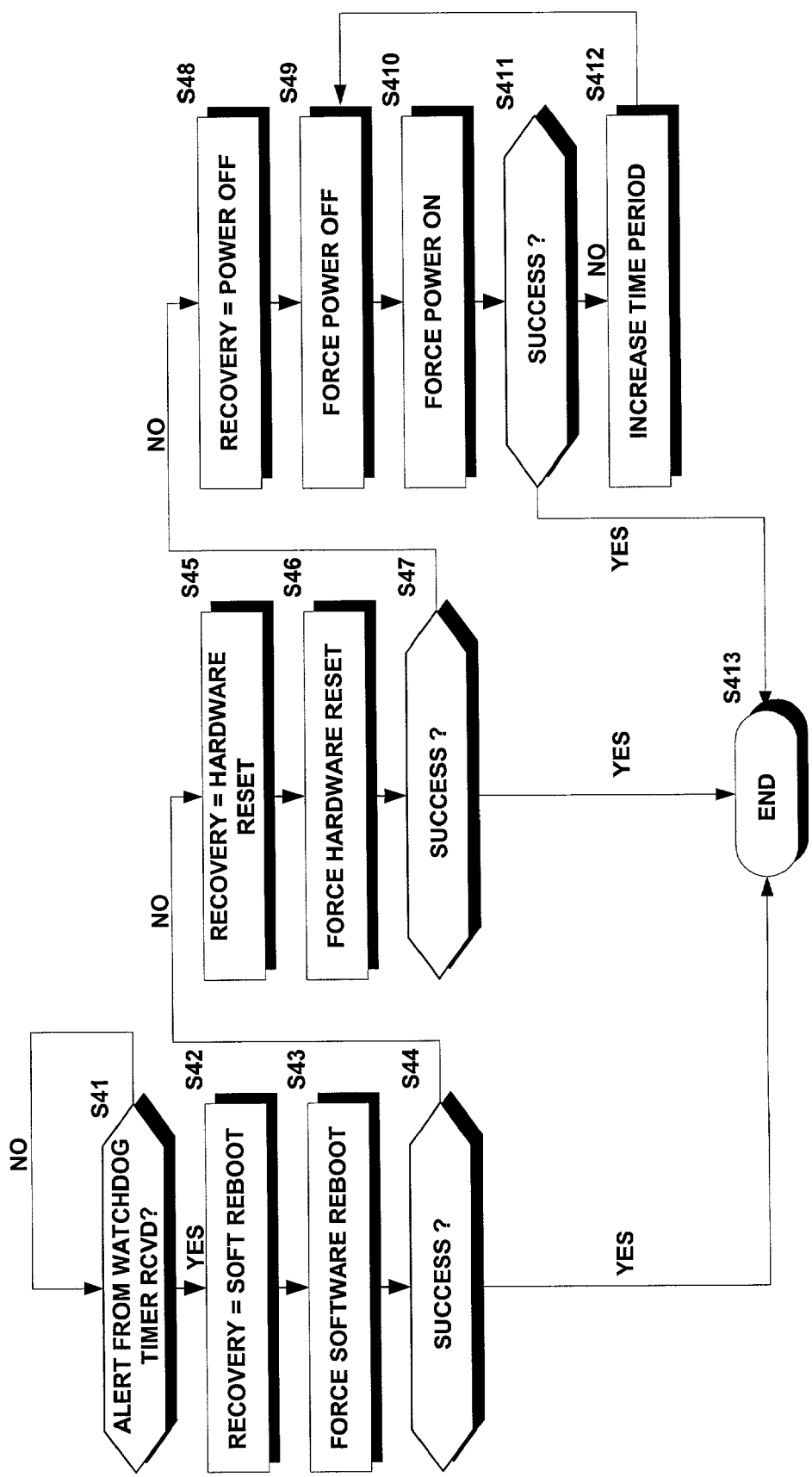
FIG. 4 is a flow chart of an operation of a restart engine, according to an embodiment of the present invention.

FIG. 4 is a flow chart of an exemplary operation of a restart engine (such as shown at 310 in FIG. 3), according to an embodiment of the present invention. According to the present invention, trusted hardware (that is, hardware that includes a TTC according to the present invention) may feature a 3-stage recovery cycle, whereby following a failure to reset the watchdog timer 308, the recovery engine 310 may automatically make up to 3 attempts(for example) to recover from the failure. As shown at S41 in FIG. 4, when the restart engine 310 receives an alert from the watchdog timer 308, the restart engine 310 may first initiate step S42, which sets the first recovery attempt at "Soft Reboot" and calls for a soft reboot of the system (such as shown at 200 in FIG. 2), which may be thought of as the equivalent of pressing the "Ctrl-Alt-Del" keys on a personal computer, for example. The soft reboot is executed at step S43. If it determined in step S44 that step S43 succeeded in restoring the system 200, the recovery process ends at S413. If the soft reboot is determined in step S44 to have been unsuccessful, step S45 may be carried out, whereby the second recovery attempt is set at "Hardware Reset" in step S45, which may be thought of as the equivalent of pressing the "Reset" button on a personal computer, for example. The system hardware is then hard reset at S46. If it is determined that the hardware reset was successful in step S47, the recovery process ends at S413. Otherwise, a third recovery attempt is carried out. Indeed, upon failing to recover from either a soft reboot or a hardware reboot, the third recovery attempt may be set at "Power Off" in step S48 and the power to the system 200 is turned off at S49 and turned on again at step S410 after a predetermined time period (such as a few seconds, for example). This may be thought of as the equivalent of turning a personal computer of for a few seconds and then turning it back on again, for example. When in the power-OFF state following step S49, the recovery engine 310 will force the power ON signal at S410 after a predetermined time period. When a recovery from power-OFF is determined to have been unsuccessful at S411, the recovery engine 310 may automatically increase the time period between power down at S49 and power up at S410, as shown at S412. This is a valuable recovery technique, as the underlying cause of the failure may be attributable to overheating. A successful recovery may occur after the equipment has had a chance to cool off. Counter and/or failure logs may keep track of the success and/or failure of each recovery attempt and may be accessible by the application software running on the system 200. Such information may be extremely valuable to the organization in charge of maintenance of the device incorporating the system 200 in assisting them in their determination of the cause of abnormal repeated recovery cycles. Recovery is also successful following an accidental power off during the execution of a transaction. FIG. 4 is but an illustrative example of a recovery process and modifications may be made to the above described methodology, as those of skill may recognize, and all such modifications are deemed to fall within the scope of the present invention. The auto-recovery feature shown in FIG. 4 is believed to be advantageous, as the tendency to use non-proven but nevertheless mission critical software on Point Of Sale (POS) terminals and Internet appliances (to name a few representative examples) is growing, as the new generation of software developers favor Internet environments and techniques such as Java over typically feature-poor embedded software. Using the recovery methodology shown in FIG. 4 or variants thereof, POS terminals or Internet appliances may automatically resume normal operation following a failure, and do so without any user awareness or intervention.

Figure 5:
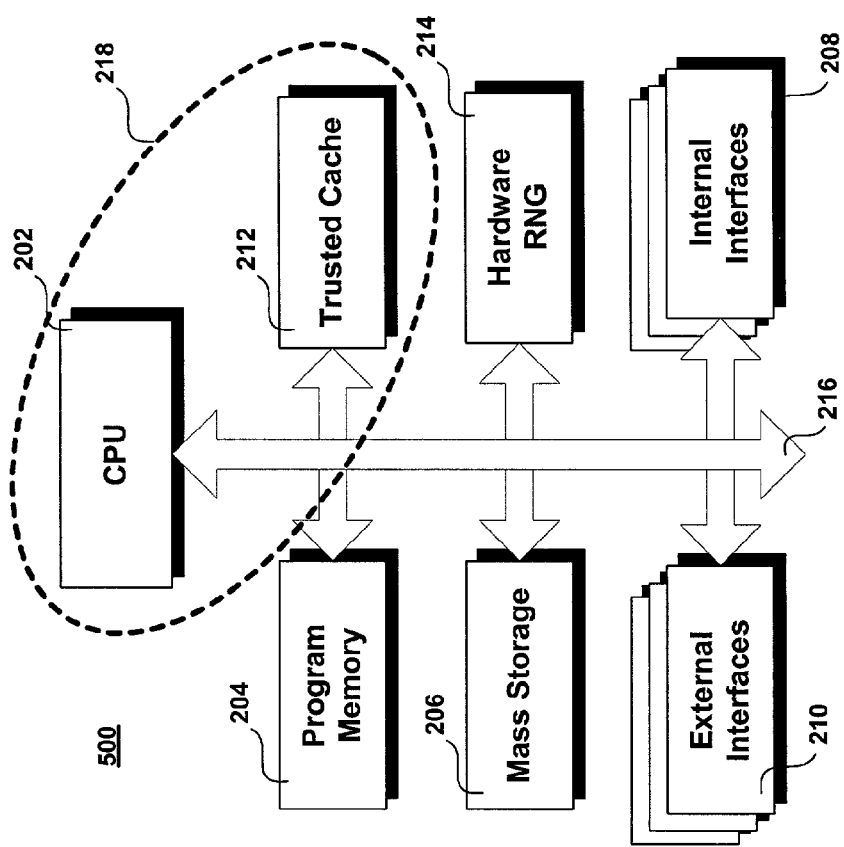
FIG. 5 is a diagram of a TTC for a Transaction Service Provider (TSP), according to an embodiment of the present invention.

FIG. 5 is a diagram of a TTC 500 for a Transaction Service Provider (TSP), according to an embodiment of the present invention. The no-battery NVRAM technology developed by Simtek Corporation is the result of combining Flash technology with standard SRAM technology on the same silicon process. Moreover, microprocessors with integrated flash memory are becoming widely available. Therefore, the trusted cache 212 may advantageously and easily be integrated together with the CPU 202 on the same silicon using a similar process, as shown at 218.

Figure 6:
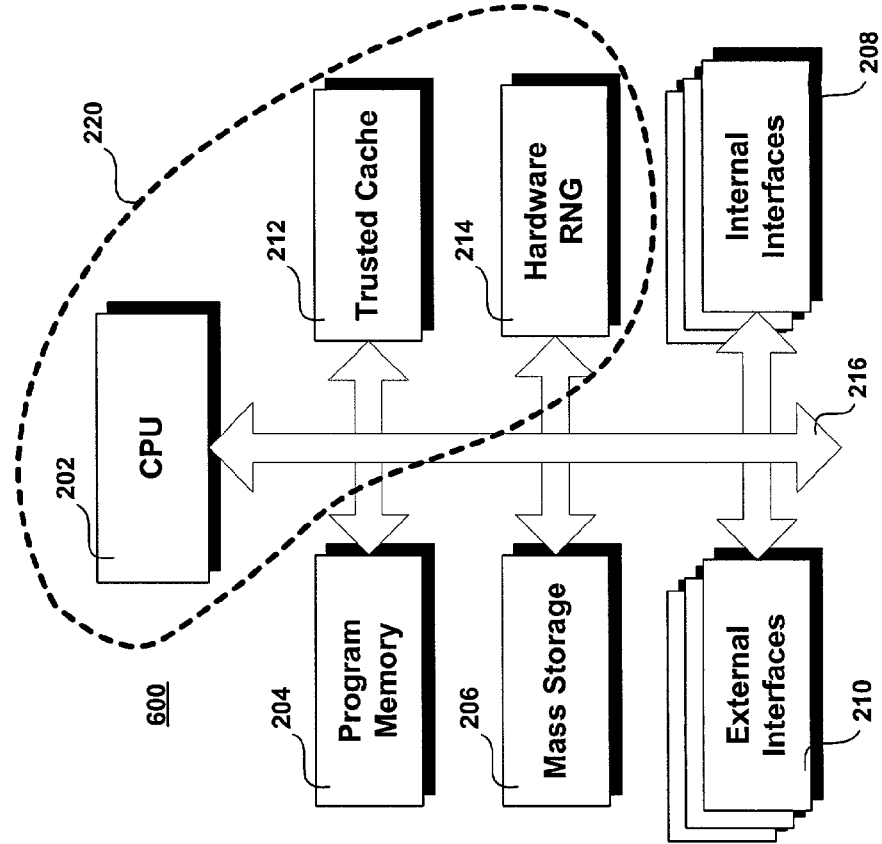
FIG. 6 is a diagram of a TTC for a TSP, according to a further embodiment of the present invention.

FIG. 6 is a diagram of a TTC 600 for a TSP, according to a further embodiment of the present invention. The hardware random number generator (RNG) technology developed by Intel Corporation (http://developer.intel.com/design/security/rng/rng.htm) is embedded within a Flash memory on the same silicon process. The thermal noise from a resistor (Johnson Noise) may be used to generate a true random, non-deterministic stream of bits. Therefore, a hardware RNG 214 may be advantageously and easily integrated together with the CPU 202 and the trusted cache 212 on the same silicon using similar process, as shown by the dashed lines referenced at 220.

Trusted Cache

As discussed hereunder, the trusted cache 212 may be used to continually store the critical states of a transaction session (such as an e-commerce transaction session, for example) into non-volatile memory. Moreover, the trusted cache 212 may advantageously feature means for automatic recovery of transaction execution following a temporary failure; that is, a software crash, a hardware latch-up or an accidental power-off, for example.

Preferably, the critical states are written to the trusted cache 212 without delay and very frequently, and are retained in case of temporary failure of the TTC, either due to power outage, software crash, hardware latch-up or simply accidental user initiated power down. Saving such critical states on media such as a magnetic hard disk is believed to be too slow and too unreliable. Likewise, saving the critical states on Flash Memory is also believed to be too slow, and the writing life may be too limited (such as on the order of 100,000 to 1 million cycles, for example).

The cache technology for the trusted cache 212, therefore, is preferably chosen from either non-volatile SRAM or magnetic core memory, for example. Battery or capacitor backed-up SRAM may be included in the trusted cache 212, but the battery life and reliability may become problematic, and capacitor retention may be unduly limited (to a period of only a few days, for example).

A technology that is well suited for the trusted cache 212 is the NVRAM technology developed by Simtek, Inc. (www.simtek.com). NVRAM caches are typically used for mission critical systems such as spacecrafts, missiles, defense systems and also in lottery terminals, for example. Using such NVRAM technology, the entire content of the program memory 204 (DRAM or SRAM) is automatically copied into in Flash memory at once, as soon as a catastrophic failure is detected. Moreover, no external electrical source is required to retain the data stored in the NVRAM 302 (FIG. 3) and data retention is guaranteed for at least 10 years. When power is re-applied, the content of the Flash memory may be automatically rewritten into the program memory 204 SRAM or DRAM and ready for access. The critical states saved to the NVRAM 302 may be encrypted to prevent tampering during the transaction recovery process.

Trusted Watchdog

Figure 7:
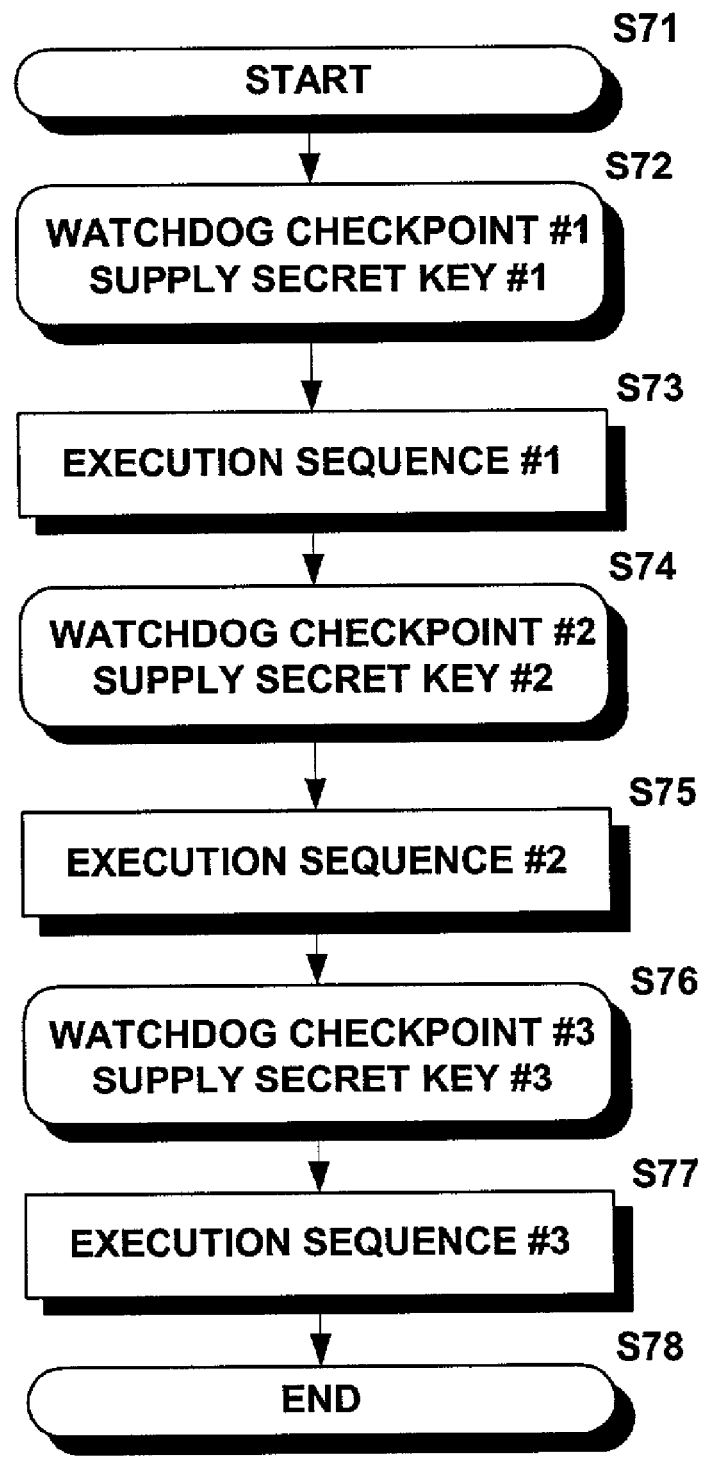
FIG. 7 is a flowchart of an execution of a trusted software for controlling a transaction, according to an embodiment of the present invention.

The watchdog 308 integrated within the trusted cache 212 is adapted to access encrypted data stored in the NVRAM 302, to decrypt the stored and encrypted data and to compare the decrypted data with a predetermined value supplied by a given program. If the supplied value does not match the decrypted data retrieved from the NVRAM 302, the watchdog 308 may activate a Power-Down cycle and/or may take some other predetermined action to maintain or restore security. Such a mechanism may form the basis for implementing a trusted watchdog 308 to prevent un-authorized or rogue software from executing. The trusted software for controlling the transactions to be carried out should preferably access the trusted watchdog 308 at predetermined checkpoints, as shown in FIG. 7.

As shown therein, any trusted (secure) software for enabling and controlling secure (e-commerce, for example) transactions, according to an embodiment of the present invention, may begin execution at S71. At a predetermined number of watchdog checkpoints within its execution cycle (three such watchdog checkpoints being shown in the illustrative example of FIG. 7), the trusted software must supply a secret key to the watchdog 308 and must supply this secret key within a selectable and/or predetermined period of time. As shown at S72, the trusted software is called upon to supply a first secret key to the watchdog 308, at a first predetermined point in its execution cycle. The watchdog 308 receives this first secret key and retrieves a corresponding first encrypted secret key from the NVRAM 302 of the trusted cache 212. The watchdog 308 then decrypts the encrypted key retrieved from the NVRAM 302 and compares it with the first secret key received from the trusted software. If the first secret key received from the trusted software matches the decrypted first key retrieved from the NVRAM 302, the trusted software is allowed to execute a first execution sequence, as shown at S73. As shown at S74, the trusted software may then be called upon to supply a second secret key to the watchdog 308, at a second predetermined point in its execution cycle. The watchdog 308 receives this second secret key and retrieves a corresponding second encrypted secret key from the NVRAM 302 of the trusted cache 212. The watchdog 308 then decrypts the second encrypted key retrieved from the NVRAM 302 and compares it with the second secret key received from the trusted software. If the second secret key received from the trusted software matches the decrypted second key retrieved from the NVRAM 302, the trusted software is allowed to execute a second execution sequence, as shown at S75. Likewise, as shown at S76, the trusted software may be called upon to supply a third secret key to the watchdog 308, at a third predetermined point in its execution cycle. The watchdog 308 receives this third secret key and retrieves a corresponding third encrypted secret key from the NVRAM 302 of the trusted cache 212. The watchdog 308 then decrypts the encrypted key retrieved from the NVRAM 302 and compares it with the third secret key received from the trusted software. If the third secret key received from the trusted software matches the decrypted third key retrieved from the NVRAM 302, the trusted software is allowed to execute a third execution (and possibly final) sequence, as shown at S77, whereupon the trusted software may allow the transaction to complete and end, as shown at S78.

Figures 8, 9:
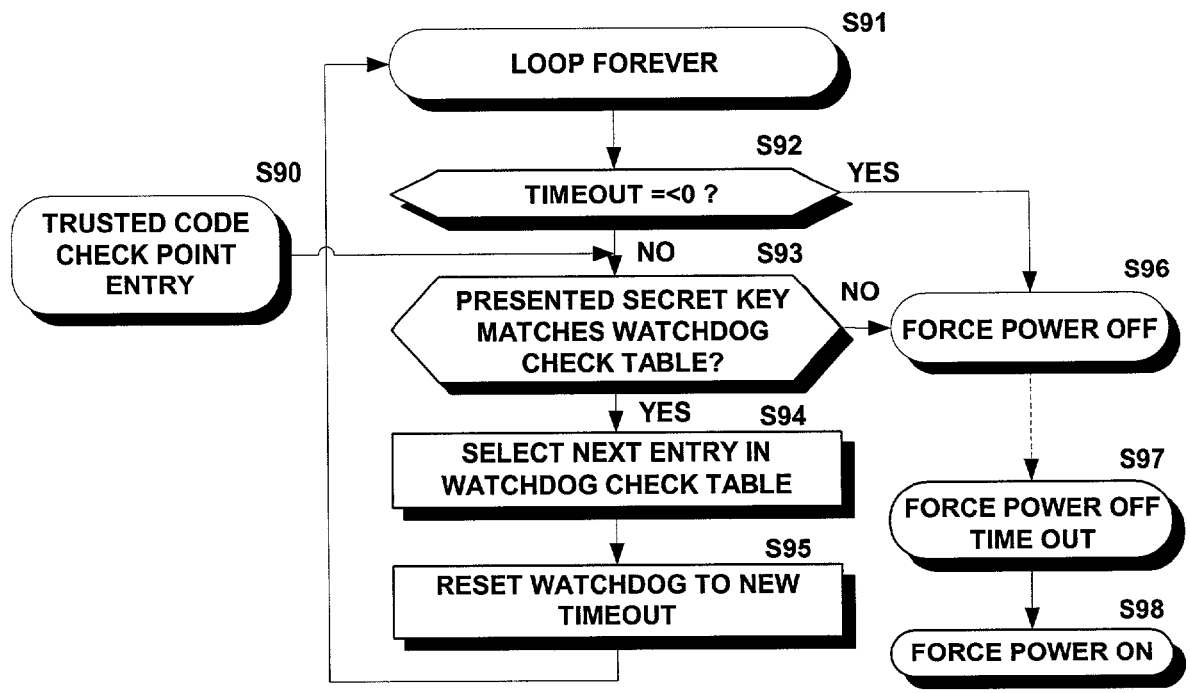
FIG. 8 is a graphical representation of a check table according to an embodiment of the present invention.
FIG. 9 is a flowchart of an exemplary operation of the watchdog according to an embodiment of the present invention.

FIG. 8 is a graphical representation of a check table 800 according to an embodiment of the present invention. The check table 800 is preferably encrypted and may be advantageously stored in the NVRAM 302 of the trusted cache 212. Preferably, the check table 800 is loaded into the NVRAM 302 in a secure manner (by a high security software utility, for example) before the execution of the trusted software controlling the transaction. The check table 800 may be unique to the trusted software controlling the transaction, and may identify the trusted software by a program ID 802. In the illustrative example of FIG. 8, the program ID is 12345. The check table 800, according to an embodiment of the present invention, includes a list of checkpoints 804 (5 such checkpoints being shown in FIG. 8), a corresponding number of timeout values (in milliseconds in the example of FIG. 8) and a corresponding number of secret keys, which may be encrypted. FIG. 9 is a flowchart of an exemplary operation of the watchdog 308, according to an embodiment of the present invention. Considering now FIGS. 8 and 9 collectively, the watchdog 308 continually monitors the operation of the trusted software controlling the execution of the transaction by looping at least through the steps S91–S95. As shown at step S90, the trusted software supplies a secret key. At step S92, as long as the watchdog timeout value is greater than zero, a watchdog alert (see FIG. 4) is not generated and the secret key presented by the trusted software is compared to the corresponding decrypted secret key 808 obtained from the check table 800 whose program ID matches the program ID of the executing trusted software. As shown at S93, if the secret key presented by the trusted software at step S90 matches the corresponding decrypted secret key 808 obtained from the watchdog table 800, the trusted software is allowed to continue its execution and the next entry (timeout value and corresponding secret key) is selected from the check table 800. The watchdog 308 is then reset to the timeout value of the selected entry in the check table 800, as shown at S95. The method then reverts to step S91. Thereafter, as long as the trusted software controlling the transaction supplies the next secret key(s) 808 before the timeout period obtained from the check table 800 elapses, the trusted software will be permitted to continue execution. However, as indicated at S92, if the appropriate secret key is not supplied by the trusted software before the expiry of the watchdog timeout value 806, a power down of the device incorporating the present invention may be forced, as indicated at S96. Alternatively or in addition to the initiation of the power down cycle, some other measure(s) may be taken to insure or maintain security of the device and/or the transaction in progress. The power may be withheld from the device incorporating the present invention for a predetermined and/or selectable period of time, as indicated at S97. At S98, the power may be restored after the power off timeout has expired, and the device incorporating the present invention may be reset, rebooted or otherwise re-initialized. Subsequent to a restart cycle, according to an embodiment of the present invention, the CPU 202 may reboot and force an extensive integrity check in order to locate corrupted data and/or virus-infected data and to initiate any necessary corrective action(s).

Hardware Random Number Generator (RNG)

A hardware RNG such as shown at 916 in FIG. 9 is extremely desirable in order to ensure maximum entropy of encryption of the secret keys such that the encrypted keys are formed of true random bits, thereby rendering a brute force attack thereon to its maximum theoretical level of difficulty.

An embedded true RNG based on diode noise, for example, enables systematic use of the highest encryption strength for the encryption algorithms and key length allowed by government. Flaws in RNGs and badly chosen encryption keys are responsible for highly publicized cracked systems such as Netscape Navigator 1.1, European GSM phones, Russian systems, etc. Although 128-bit encryption such as RSA, 3DES, etc. requires a considerable theoretical computer power to crack, a badly chosen encryption key may result in the secret keys being cracked within hours.

Because of all the sensitive and personal data that home users may have on their PCs and other devices connected to the Internet 104 and/or to other networks via the home network (for example), there is a need to provide the TTC with almost "Military Defense class" security. Virtual private Networks (VPNs), Secure Socket layer (SSL) and other secure communication protocols that rely on locally generated encryption keys are solutions that are widely available today. The resilience of such encryption protocols to attack depend on the quality of the encryption keys or their maximum entropy, such as discussed in Schneider, *Secrets and Lies: Digital Security in a Networked World*, Wiley & Sons, Inc. © 2000, pages 102–106, which is incorporated herein by reference.

Trusted e-commerce Transactions

It is generally recognized that the reliability of embedded computing hardware such as Internet Appliances is far greater than the reliability of Internet and of wireless networks. The Internet 104 is a very cost effective medium for viewing rich information and for performing purchases in a secure manner, using smart cards and encryption techniques, for example. However, the availability of the Internet 104 is often unpredictable. Furthermore, an e-commerce transaction may take minutes to complete and any failure between the Internet 104 Appliance and the remote e-commerce server 534 may leave the transaction in an unknown state and the user frustrated or mislead.

The present invention, therefore, offers methods, systems and transaction models for conducting trusted lightweight e-commerce transactions via a TTC according to the present invention, whereby the e-commerce transaction is performed in seconds or even fractions of seconds. Moreover, the user of the present invention need not be concerned by the possible failure of the transaction commit to the remote server 534. Moreover, deployment of very large numbers of such TTCs according to the present invention (such as 10 millions units), will not slow the connected e-commerce remote server 534 or servers 534 to a crawl when all the TTCs are committing transactions simultaneously because of a particular event. The remote servers 534 may be configured to accept the lightweight transactional model and easily handle on the order of 1,000,000 transactions per second. A suitable remote server is described in commonly assigned U.S. application Ser. No. 09/565,579 filed on May 4, 2000 and entitled "Fast Web Interface Server, Network Architectures and Systems Using Same", the disclosure of which is incorporated herewith in its entirety.

The lightweight e-commerce transactions described herein are an effective and low cost way to provide ultra fast and secure micro-payment or e-microcommerce (wherein the terms refers to low valued and/or frequent transactions—although the applicability of present invention is not limited to such micro-transactions) solutions for a multitude of competitive providers (with whom the user need not necessary have an open account). Such e-microcommerce transactions may include transactions related to on-demand music listening or delivery, on-demand HDTV music video clips or concerts, charm videos, magazine articles, betting, casino gambling, and voting, to name only a few representative candidates for such a micro-payment model.

"Provisional" and "Confirmed" Receipts

The transactional model proposed herein for conducting trusted lightweight e-commerce transactions via the TTC of the present invention is applicable to transactions such as occur in large lotteries, whereby the TTC is the transaction "master".

Figure 10:
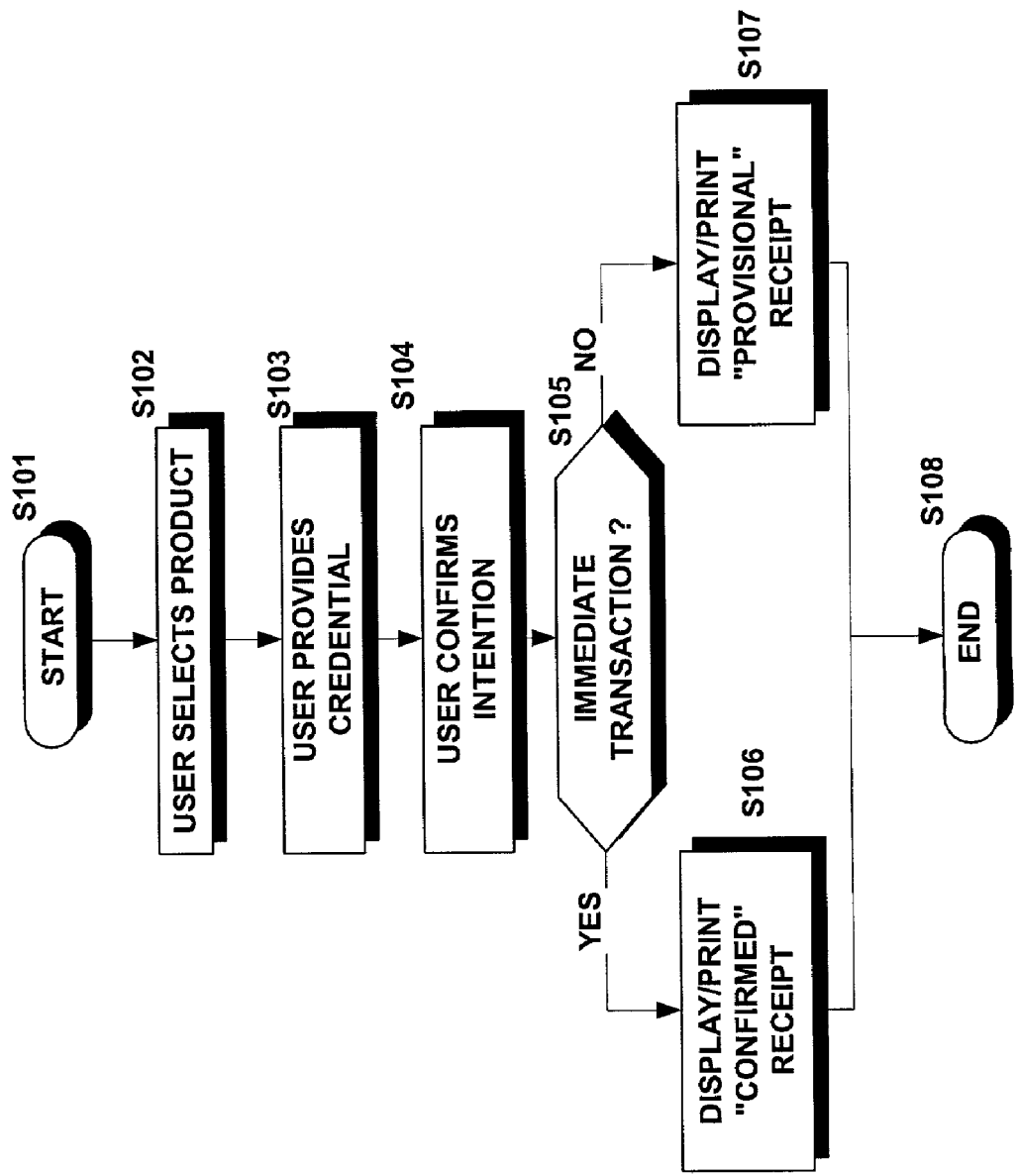
FIG. 10 is a flowchart of a transactional model for providing "Provisional" and "Confirmed" receipts of a trusted lightweight e-commerce transaction, according to an embodiment of the present invention.

FIG. 10 is a flowchart of a transactional model for providing "Provisional" and "Confirmed" receipts of a trusted lightweight e-commerce transaction, according to an embodiment of the present invention. As shown therein, the transaction starts at S101 and the user (not shown) selects a product and/or services provided by provider of such products and/or services, as shown at S102. At S103, the user provides any requested credentials, such as any requested and/or required authentication and/or payment instrument information, as shown at S103. The user may then be presented with an opportunity to confirm the selected product(s) and/or services at S104.

Transactions that are accepted by the remote server 534 in a predetermined and/or selectable short period of time (such as on the order of 1 second for example) are named "immediate transactions" herein. When it is determined at step S105 that the current transaction is an immediate transaction (such as when a transaction confirmation is received from the remote server 534 within the predetermined and/or selectable short period of time), the user is given a "confirmed acknowledgement" (or receipt, as the terms acknowledgment and receipt are used interchangeably herein) as shown at S106. When immediate transactions are not possible (such as when a transaction confirmation is not received from the remote server 534 after expiry of the predetermined and/or selectable short period of time), the user is given a "provisional acknowledgment" or receipt, as shown at S107. The transaction may then end at S108. If the user has received a provisional acknowledgment, the user may request a confirmed acknowledgment at some later point in time, if the user so desires. Very quickly, the user will trust the reliability of the transaction strategy proposed herein, and will not bother to systematically request a confirmed acknowledgement/receipt when a provisional receipt has been issued. If in doubt, the user always has the option and ability of requesting a confirmed acknowledgement/receipt.

In the case of non-immediate transactions according to the present invention, the actual time to complete the overall transaction is preferably masked from the user. The user (person initiating the transaction) remains satisfied with the transaction because of the short period of time needed to complete the transaction. The reliability and the speed of completion of the overall transaction is ensured by relying on the "transaction master" model and the use of the trusted cache 212, as explained below.

Immediate Transaction

Figure 11:
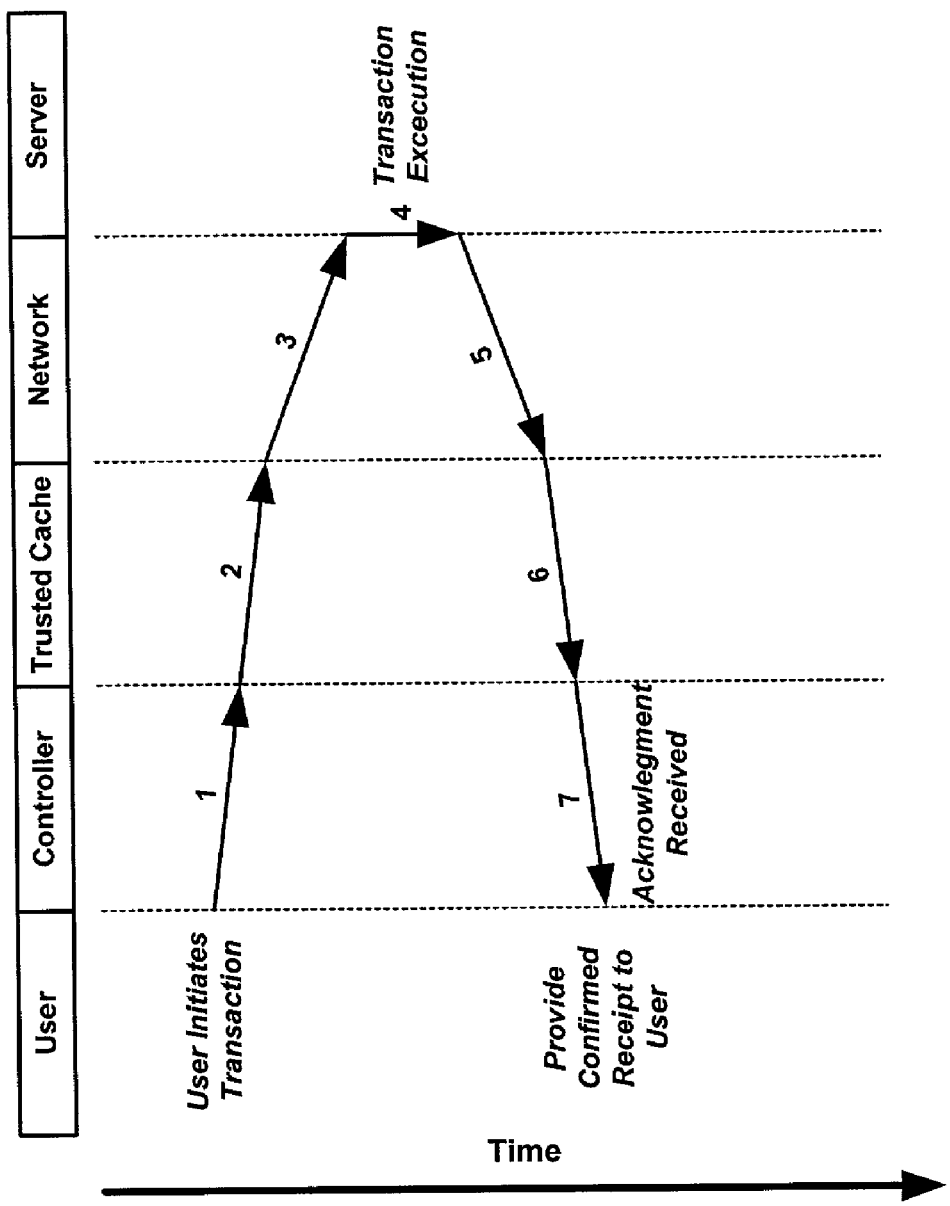
FIG. 11 is a diagram showing the timing of an immediate trusted lightweight transaction, according to an embodiment of the present invention.

FIG. 11 is a diagram showing the timing of an immediate trusted transaction as the transaction progresses from the user to the server 534 and back to the user, as a function of time, according to an embodiment of the present invention. When an immediate transaction is possible, the transaction may proceed as follows. When initiating a transaction, the user may supply one or more of the following: an identification of the desired product and/or service, the identity of the supplier(s), the user's personal information and/or payment instrument information (which may be inputted by the user or retrieved automatically from secured personal storage), for example. As shown at (1), the TTC according to the present invention may encapsulate all the user-supplied aforementioned information in a single packet (all such sensitive data being preferably secured in accordance with a predetermined security/encryption protocol), and may then store a copy of the packet into the trusted cache 212, as shown at (2). The packet may then routed through the network (3) (including, for example, the Internet 104) until it reaches the remote server 534. The information related to the item(s) chosen, together with the personal information and/or payment instrument information and the delivery address are sent to the remote server 534 in the same single packet. The sensitive information may be encrypted using, for example, the provider's public key that is automatically made available together with the rich content describing the product or service, thereby avoiding the unnecessary overhead of establishing a full SSL or Transport Layer Security (TLS) session. The remote server 534 may then complete the transaction (4) and may return a confirmed acknowledgment packet back through the network (5). A copy of the returned confirmed acknowledgment packet may then be copied to the trusted cache 212 (6), and a receipt may be generated by the TTC (7) that is then displayed or printed or otherwise provided to the user.

Cached Transaction

Figure 12:
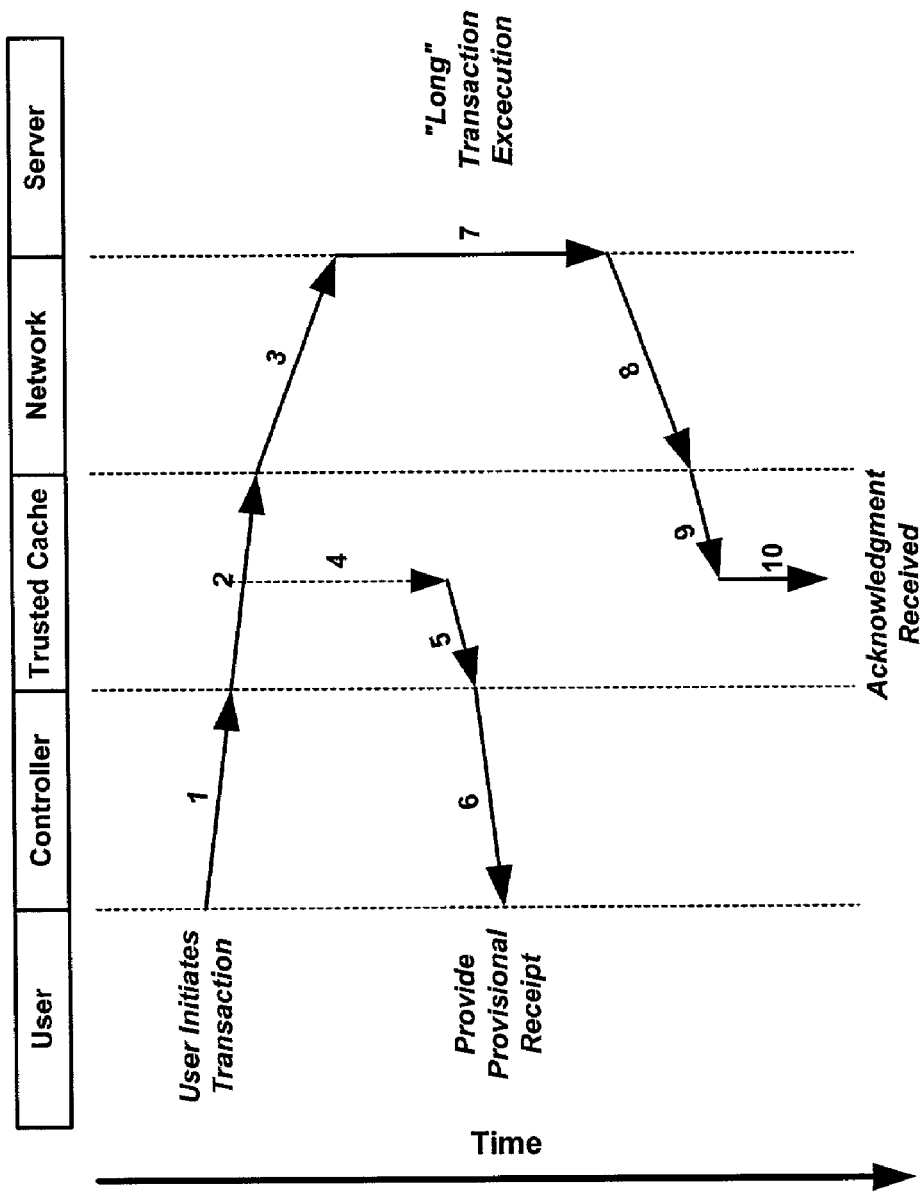
FIG. 12 is a diagram showing the timing of a cached trusted lightweight transaction, according to an embodiment of the present invention.

When an immediate transaction is not possible, a cached transaction is executed. FIG. 12 is a diagram showing the timing of a cached trusted lightweight transaction as the transaction progresses from the user to the server 534 and back to the user, as a function of time, according to an embodiment of the present invention. When initiating a transaction, the user supplies one or more of the following: an identification of the desired product and/or service, the identity of the supplier(s), the user's personal information and/or payment instrument information (which may be inputted by the user or retrieved automatically from secured personal storage), for example. The TTC, as shown at (1), may the encapsulate all of the aforementioned information in a single packet (all such sensitive information being secured in accordance with a predetermined security/encryption protocol), and may then store a copy of the packet in the trusted cache 212 (2), such as shown at 212 in FIGS. 2 and 3. The packet may then be routed through the network (3) (including, for example, the Internet 104).

After a predetermined time-out (4), a provisional acknowledgement packet (5) is produced based on the user transaction request already committed to the trusted cache 212. The TTC of the present invention may then generate a provisional acknowledgement (6) that is viewed or printed or otherwise made available or provided to the user.

After a certain amount of time, the remote server 534 completes the transaction (7) and may return a confirmed acknowledgment packet back through the network (8). A copy of the returned confirmed acknowledgment packet may then be copied to the trusted cache 212 (9), and the confirmed acknowledgment may be retained in the trusted cache 212 (10). This execution flow has the advantage of providing the user with a provisional acknowledgment very shortly after the user has initiated the transaction, even if a confirmed acknowledgment is not available until some later time. The user retains the option of returning to the device that incorporates the TTC of the present invention and requesting a confirmed acknowledgment corresponding to the previously provided provisional acknowledgment.

Failed Transaction

Figure 13:
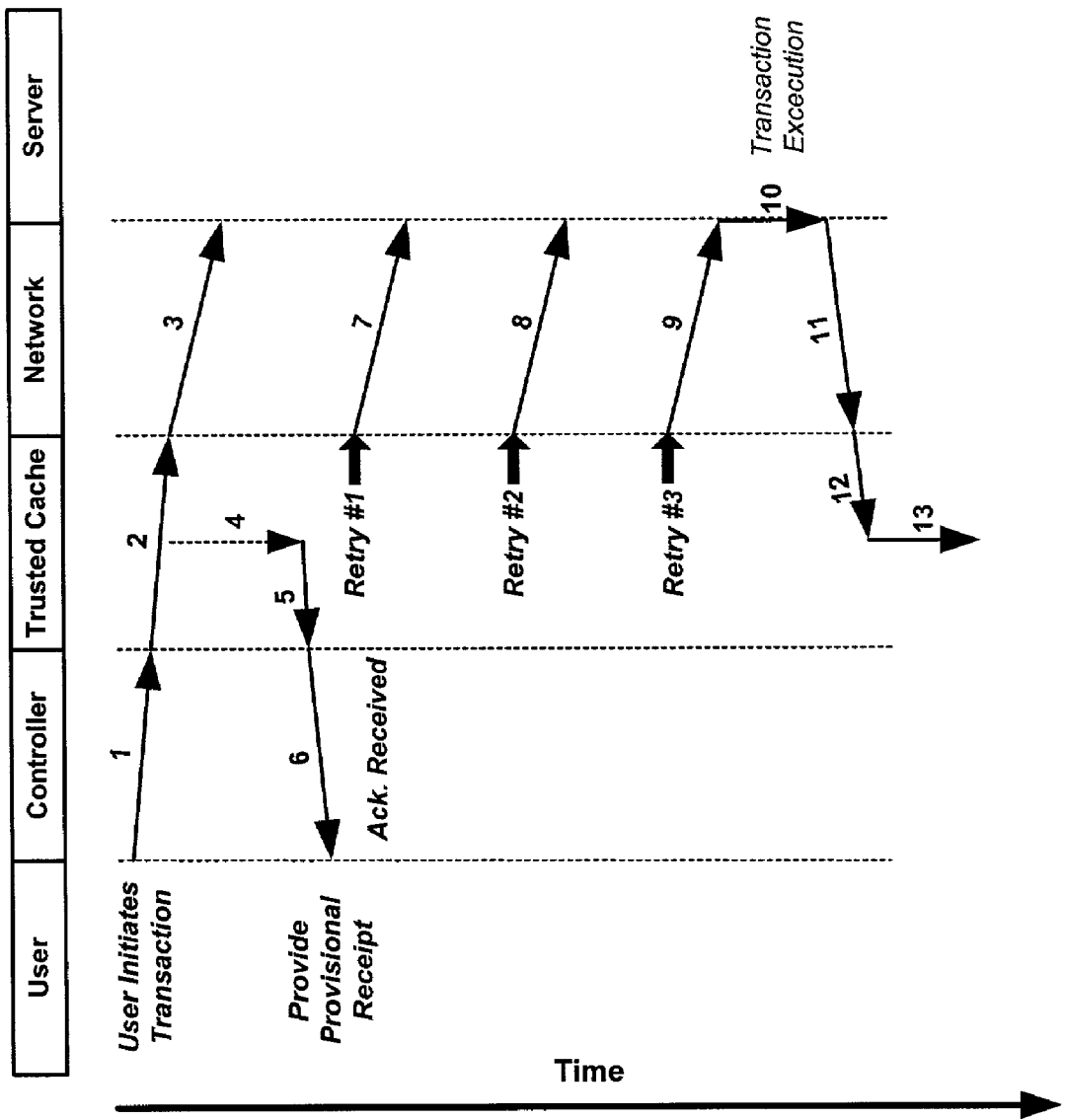
FIG. 13 is a diagram showing the timing of a failed trusted lightweight transaction, according to an embodiment of the present invention.

FIG. 13 is a diagram showing the timing of a failed trusted lightweight transaction as the transaction progresses from the user to the server 534 and back to the user, as a function of time, according to an embodiment of the present invention. When initiating a transaction, the user may supply one or more of the following: an identification of the desired product and/or service, the identity of the supplier(s), the user's personal information and/or payment instrument information (which may be inputted by the user or retrieved automatically from secured personal storage), for example. The TTC (1) may the encapsulate all of the aforementioned information in a single packet (all such sensitive information being secured in accordance with a predetermined security/encryption protocol), and may then store a copy of the packet in the trusted cache 212 (2), such as shown at 212 in FIGS. 2 and 3. The packet may then be routed through the network (3) (including, for example, the Internet 104).

After a predetermined time-out (4) has elapsed without the generation of a confirmed acknowledgment packet by the server 534, a provisional acknowledgement packet (5) may be produced by the TTC itself, based on the user transaction request already committed to the trusted cache 212. The TTC of the present invention may then generate a provisional acknowledgement (6) that is viewed or printed or otherwise made available or provided to the user.

When the cached transaction packet (3) fails to reach the remote server 534, a first retry packet (7) is sent through the network after a predetermined and/or selectable period of time. If no acknowledgement is received from the remote server 534 after a predetermined and/or selectable period of time, a second retry packet (8) is sent to the network. The same scenario may be repeated forever or (preferably) for a selectable number or retries or period of time or until an acknowledgement is received from the remote server 534.

In the example illustrated in FIG. 13, the third retry packet (9) reaches its destination (the remote server 534) and the transaction is successfully executed (10). A confirmed acknowledgment is routed back through the network (11). A copy of the returned acknowledgment packet is copied to the trusted cache 212 (12), and a confirmed acknowledgment may be retained in the trusted cache 212 (13) and optionally provided to the user upon request.

Such a transaction model, whereby the TTC is the transaction "master" that initiates the transaction with the remote server 534 and repeats forever or for a predetermined number of times until a valid transaction acknowledgment from the remote server 534 is received, is extremely robust albeit lightweight (the transaction consists of single forward packet and a single return packet). This enables a the remote server 534 to handle a great many such transactions simultaneously without becoming overwhelmed by the data traffic necessary to complete such a great number of transactions. Moreover, there is no need to identify the exact location and type of failure or to initiate a specific recovery. Indeed, any failure, whether on the outbound network path (i.e., toward the remote server 534), at the remote server 534 or on the network return path (from the remote server 534 back toward the user) may be automatically recovered according to this transaction model. Any duplicate packet that may be received at either end may simply be ignored.

It is to be noted that the user is not aware of the possible delay in receiving the acknowledgement from the remote server 534. This feature is expected to be appreciated by users, especially when performing numerous micro-payments, as servers conventionally take a long time to get approval from clearing banks.

Confirmed Acknowledgment Request

Figure 14:
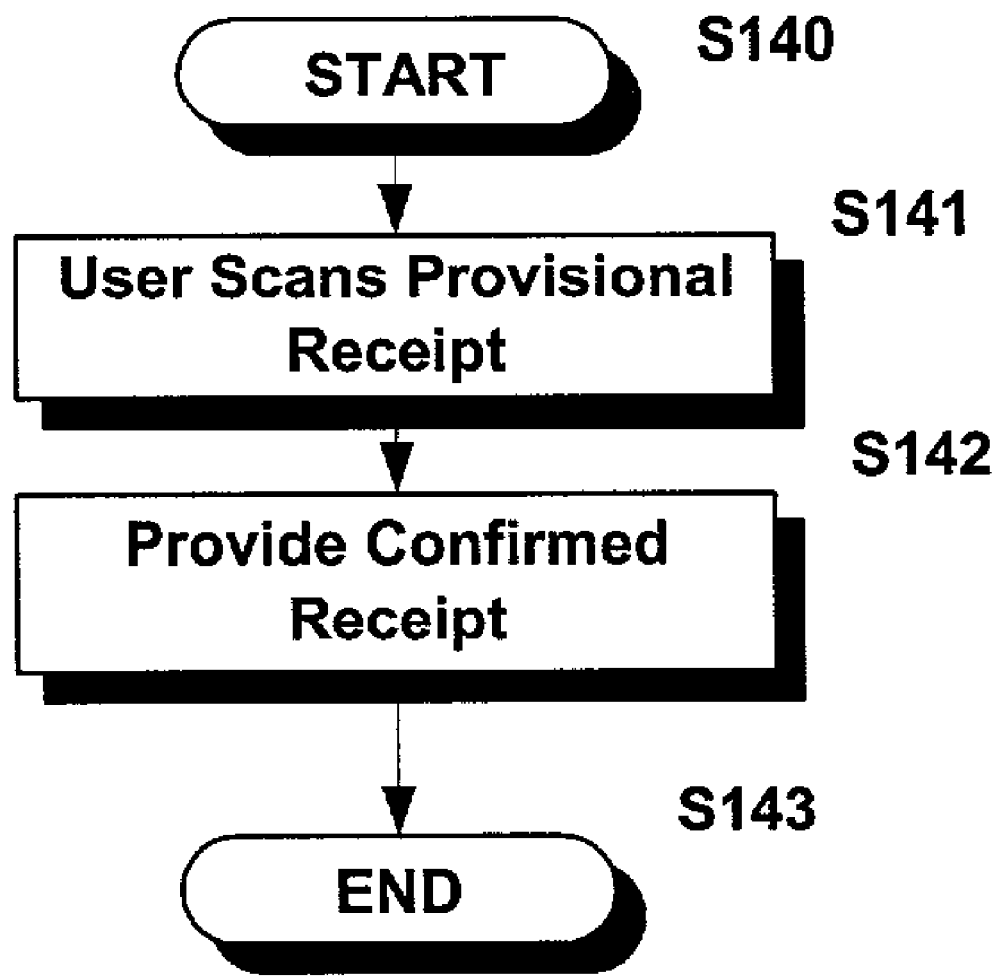
FIG. 14 is a flowchart of a request for a confirmed acknowledgment, according to an embodiment of the present invention.

FIG. 14 is a flowchart of a request for a confirmed acknowledgment, according to an embodiment of the present invention. Whenever the user is given a provisional acknowledgment, the user may, at some later time, request a corresponding confirmed acknowledgment. If the device incorporating the TTC according to the present invention is equipped with a ticket or receipt printer and a barcode scanner (or other machine vision system), the user may initiate a request for a confirmed acknowledgment at S140 in FIG. 14 by simply presenting the previously received provisional acknowledgment to the bar code scanner and scan a barcode (or other machine readable indicia) printed on the provisional acknowledgment as shown at S141 and the device prints out a confirmed acknowledgment (a ticket or receipt) as shown at S142 to complete the request at S143, in accordance with the procedures detailed below.

"In-Cache" Confirmation Transaction

Figure 15:
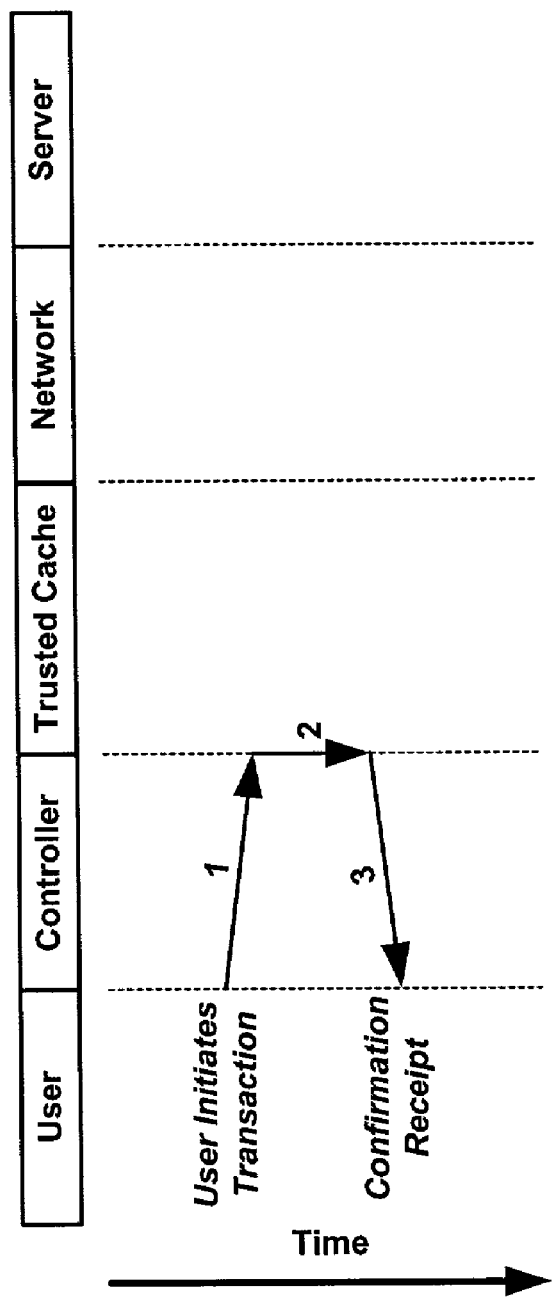
FIG. 15 is a diagram showing an in-cache confirmation of a trusted lightweight transaction, according to an embodiment of the present invention.

FIG. 15 is a diagram showing an in-cache confirmation of a trusted lightweight confirmation, according to an embodiment of the present invention. Depending on the time taken by the remote server 534 to complete the transaction, the confirmed acknowledgment may already be available in the trusted cache 212. In that case, the user need only present the previously received provisional acknowledgment to the device incorporating the trusted controller of the present invention and the request (1) may be immediately responded to with the relevant data contained in the trusted cache 212 (2), and a confirmed acknowledgment generated (3) and printed, displayed or otherwise made available to the user.

"Out-Of-Cache" Confirmation Transaction

Figure 16:
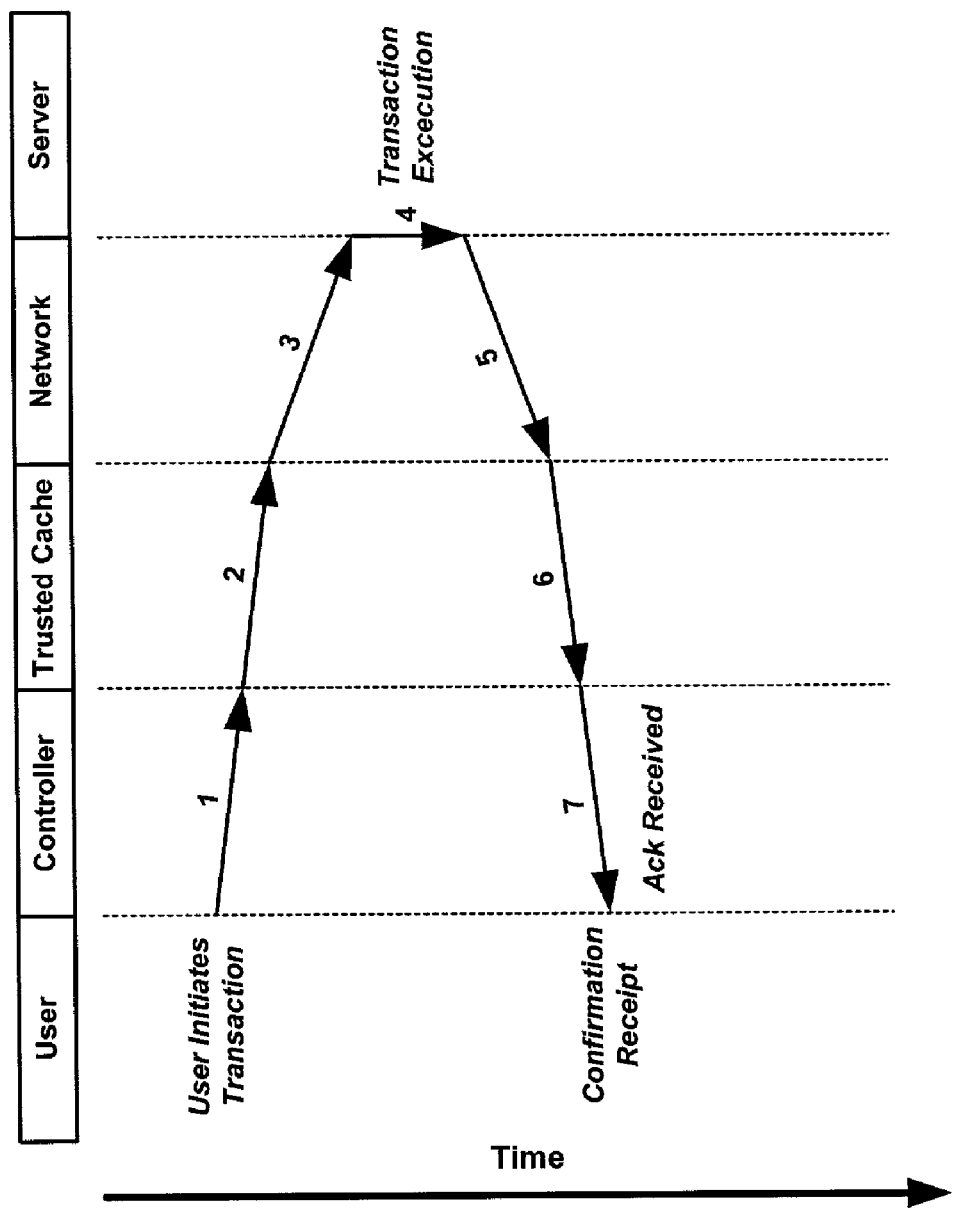
FIG. 16 is a diagram showing the timing of an out-of-cache confirmation of a trusted lightweight transaction, according to an embodiment of the present invention.

FIG. 16 is a diagram showing the timing of an out-of-cache confirmation of a trusted lightweight transaction, according to an embodiment of the present invention. If the confirmed acknowledgement is not present in the trusted cache 212 (for whatever reason), the request therefor is forwarded to the remote server 534 via the outbound path (1) (2) and (3) through the controller, trusted cache 212 and the network, whereupon the remote server 534 sends back a transaction confirmed acknowledgment (4) that is routed back to the TTC via the return path (5) (6) and (7). If the remote server 534 does not respond due to some failure along the way, the TTC of the present invention may continuously repeat the request for confirmed acknowledgment until a reply is received. When the remote server 534 has completed the earlier-initiated e-commerce transaction, it will cache the confirmed acknowledgment such that a subsequent request from the TTC can be immediately responded to and the confirmed acknowledgment sent from the remote server's 534 cache to the trusted cache 212 of the trusted controller of the present invention. If the confirmed acknowledgement is not ready, it will simply ignore the request therefor, thereby forcing the TTC to repeat the request after a predetermined time until the confirmed acknowledgment is received. In the end, a confirmed acknowledgment is generated and provided to the user, the confirmed acknowledgment indicating either success of the transaction or failure thereof (due, for example, by the user's payment instrument being declined).

Transaction Session

Figure 17:
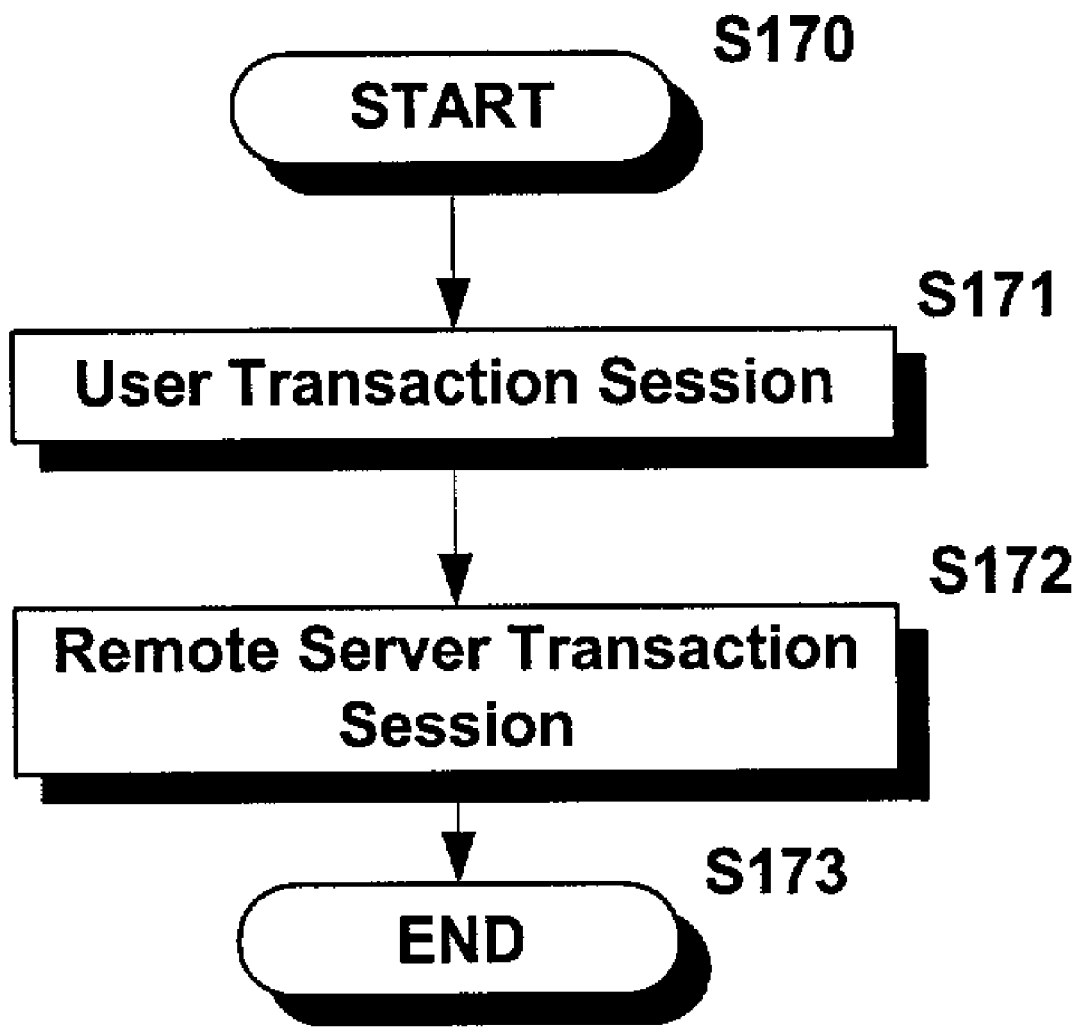
FIG. 17 is a flowchart of a transaction session, according to an embodiment of the present invention.

FIG. 17 is a flowchart of a transaction session, according to an embodiment of the present invention. The overall trusted transaction session called a "Transaction Session" that begins at S170 and ends at S173 that is executed by the TTC control software comprises two sessions; namely a User Transaction Session S171 followed by a Remote Server Transaction Session 172, the details of which are discussed below.

User Session

Figure 18:
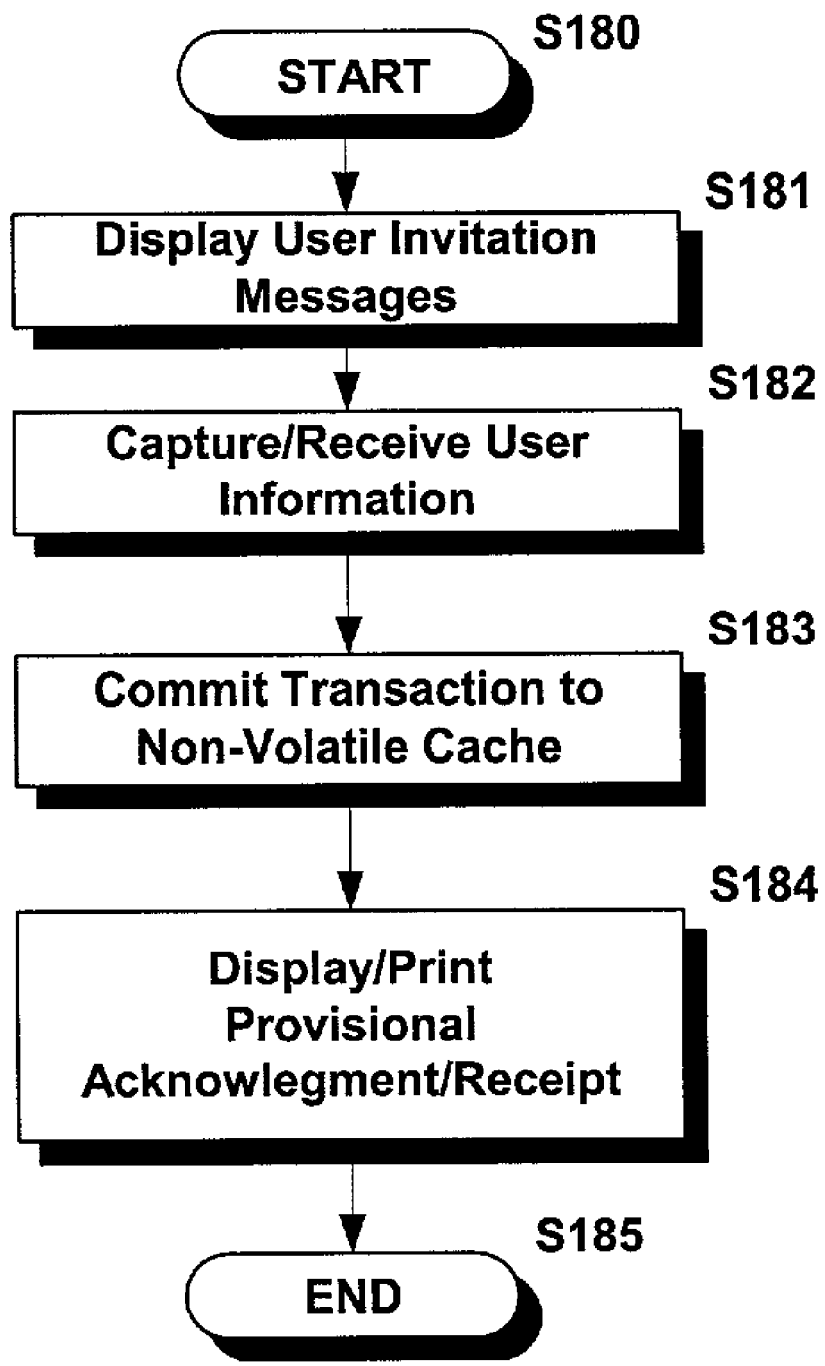
FIG. 18 is a flowchart of a user session, according to an embodiment of the present invention.

FIG. 18 is a flowchart of a user session, according to an embodiment of the present invention. The user session begins at S180 and ends at S185 and may include one or more of the following intervening steps. As shown at S181, a display may invite the user to initiate a purchase for a product and/or service. The user may then confirms his or her intention to initiate a purchase. The user's personal and/or financial information (identity, payment instrument details, etc.) may then be captured and/or inputted into the device incorporating the TTC according to the present invention, as shown at S182. The TTC thus captures the user's personal and/or payment credentials using some means of interaction, or alternatively from secured personal storage accessible to the TTC control software. The TTC control software may then commit the transaction to the non-volatile trusted cache 212, as shown at S183, after which the TTC may provide, display or print a provisional acknowledgment for the user, as shown at S184. According to the present invention, the user need only be involved during the user session 180–S185, which may take only a few seconds or even less if bar-coded (or machine readable) items are scanned by the barcode (for example) reader.

Server Session

Figure 19:
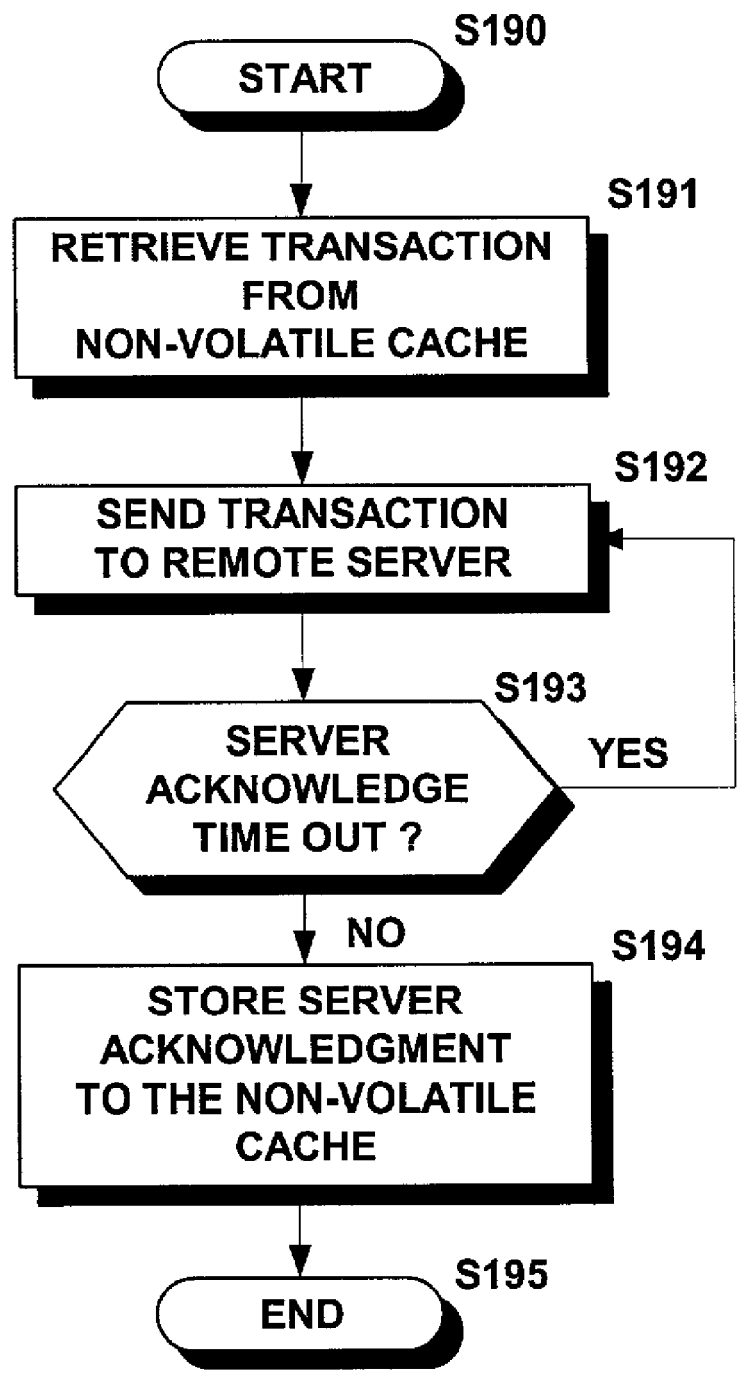
FIG. 19 is a flowchart of a server session, according to an embodiment of the present invention.

FIG. 19 is a flowchart of a server session from its initiation at S190 to the conclusion thereof, at S195, according to an embodiment of the present invention. According to the present invention, the server session may include one or more of the following steps. As shown at S191, the TTC control software retrieves the transaction committed in the nonvolatile trusted cache 212 during the user session. The TTC then sends the transaction to the remote server 534 over a computer network or other communication channel, as shown at S192. If no acknowledgement is received from the remote server 534 by a predetermined and/or selectable timeout period, the TTC of the present invention may continually (or for a predetermined period of time or for a predetermined or selectable number of attempts) resend the transaction packet to the remote server 534, as indicated at S193. If the acknowledgment is indeed received by the TTC before the timeout period has elapsed, the received acknowledgment may be stored in the NVRAM 302 of the trusted cache 212. As is apparent from FIG. 19, the user of the TTC of the present invention (or the user of the device incorporating the present TTC) is not involved in the remote server 534 session. Optionally, the TTC control software may notify the user of the successful completion of the transaction by printing or otherwise providing the confirmed acknowledgment automatically, such as by sending an email to the user or by activating an alert message, to name a few possibilities.

In order for a transaction session to complete successfully without involving the user, it is necessary to examine all the failure situations that may interfere with the completion of the transaction. A formal methodology called Failure Modes, Effects and Criticality Analysis (FMECA) is useful in exhaustively identifying all possible failure possibilities, their impact and the effectiveness of the remedies.

The most common cause of transaction failure may be caused by the remote server 534 failing to timely respond with an acknowledgment of the transaction, for whatever reason (including, for example, a failure at some point along the communication path outside the TTC). An effective remedy to such a failure is the transaction model described above, whereby the TTC is the transaction "master" that initiates and maintains control over the transaction with the remote server 534. Advantageously, the TTC according to the present invention may repeatedly send the transaction to the remote server 534 until a valid transaction acknowledgment is received from the remote server 534. The second common cause of transaction failure may be attributed to failure of the TTC, due to mains power-failure, user power down, software crash and/or hardware latch-up, for example. An effective remedy to such failures is the use of a non-volatile data cache 302 of the trusted cache 212 in which the critical states of the transaction are frequently saved. The control software of the TTC may then recover the context of the transaction from the critical state information stored in the trusted cache 212, and then resume its execution and control over transaction until completion thereof.

Transaction Critical States

Figure 20:
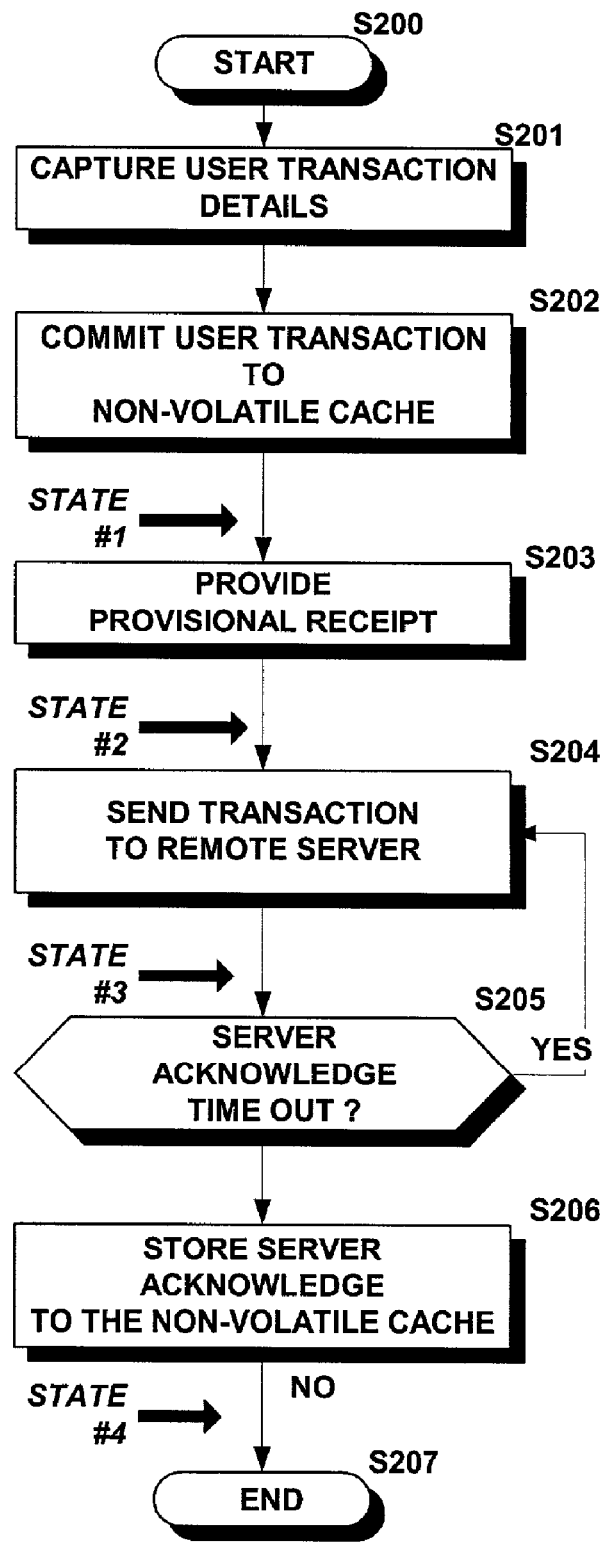
FIG. 20 is a flowchart showing the timing of the saving of the critical states of a trusted lightweight transaction, according to an embodiment of the present invention.

FIG. 20 is a flowchart showing the timing of the saving of the critical states of a trusted lightweight transaction, according to an embodiment of the present invention. The essential critical states are State#1, State#2, State#3, and State#4, as shown in the flowchart. The present invention provides for the saving in the trusted cache 212 of all the data necessary to describe the context of the transaction at that particular instant, including the state number itself. This saving of the critical states may carried out four times per transaction as shown in FIG. 20, or more or less often as necessary. Following a failure of the transaction, the TTC and/or the remote server 534 occurring between any of these critical states, the present TTC may retrieve the last saved state information from the trusted cache 212 and seamlessly resume and complete the execution from the saved state onward. As shown in FIG. 20, the method beings at S200, whereupon the present TTC captures (or retrieves) the user's personal and/or financial information. In step S202, after the user has selected products and/or services and committed to a transaction, the details of the user's transaction are committed to the NVRAM 302 of the trusted cache 212. The TTC of the present invention may then save all of the information necessary to reconstruct and continue the transaction to non-volatile memory 302, as shown at State#1. At S203, the TTC may print, display or otherwise provide the user with a provisional acknowledgment or receipt. This state of the transaction (State#2) may then also saved to non-volatile memory 302. The user's transaction may then, as shown at S204, be sent to the remote transaction server 534, and the current state information may then again saved to non-volatile memory 302, as shown at State#3. As indicated at S205, step S204 may be repeated (indefinitely if necessary) until a timely acknowledgment is received from the remote server 534. Alternatively, step S203 may be omitted between steps S202 and S204 and carried out only when the remote server 534 initially fails to send a timely acknowledgement back to the present TTC. Upon receiving an acknowledgment from the remote server 534, the present TTC may store the received acknowledgement and all necessary contextual information to the non-volatile memory 302, as shown at State#4, whereupon the method ends at S207.

Recovery from Trusted Transaction Controller Temporary Failure

Figure 21:
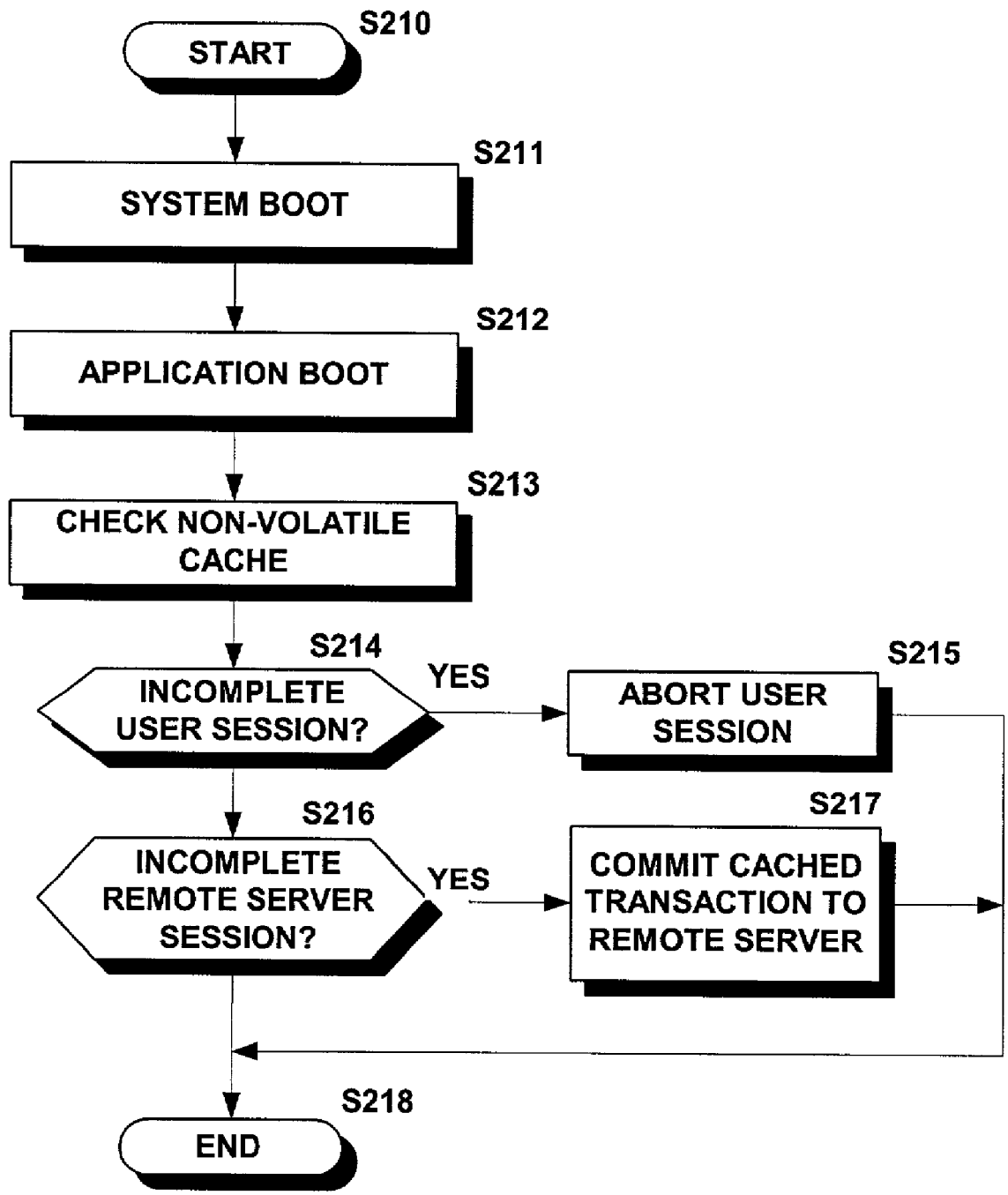
FIG. 21 is a flowchart illustrating the recovery from a temporary failure of a TTC, according to an embodiment of the present invention.

FIG. 21 is a flowchart illustrating the recovery from a temporary failure of a TTC, according to an embodiment of the present invention. Assuming a successful recovery cycle following a temporary failure whereby the TTC is successfully re-started, the TTC may execute the steps S210–S218 shown in the flowchart of FIG. 21. Namely, the operating system of the present TTC may reboot as shown at S211 and the application may start-up or boot as shown at S212. Thereafter, the CPU 202 (see FIGS. 5 and 6) may examine the contents of the trusted cache 212, as shown at S213. If the last saved critical state (see FIG. 20) indicates that a user session is not completed at S214, the TTC may abort the user session, as shown at S215 and end the recovery, as shown at S218. If it is determined step in S216, however, that the last critical state saved shows that a remote server 534 session is incomplete, the saved state information may be retrieved from the trusted cache 212 and the transaction committed (sent) to the remote server 534, as shown at S217. The content of the trusted cache 212 may be encrypted or digitally signed, in order to prevent tampering during the transaction recovery process, by service people (for example) if the present TTC is sent for repair or service.

It is to be noted that the user may choose not to receive a provisional acknowledgment (ticket). In that case, only the confirmed acknowledgment will be printed or otherwise provided whenever the acknowledgement is received from the remote server 534. In either case, the user need not wait in front of the display screen for the overall transaction to complete, and would therefore be afforded additional time to fully enjoy the shopping and/or entertainment experience provided by the present TTC.

As noted above, the present TTC (and not the remote server 534) is the transaction "master". Therefore, user personal and payment instrument information and the like are supplied to the remote server 534 under the full control of the TTC, including recovery from failure. Consequently, users will very quickly come to trust such a system, especially when many small merchants are involved in such e-microcommerce transactions that depend upon frequent micro-payments.

It is not recommended, within the context of the present invention, to encapsulate the transaction model described within XML, because of the large overhead created by XML. Instead, the transaction model proposed herein may advantageously be used as a means to efficiently and securely process the transaction "payload" while the associated rich and "free" content may be handled according to traditional protocols, such as HTML, Java, XML, for example. It should be apparent that the transactional model and trusted transactional controller proposed herein may be initiated by a user from any client PC or client TTC connected to a home network.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A controller coupled to a host processor, the host processor being configured to execute a software program, the controller comprising:
    a nonvolatile memory;
    a context data save engine adapted to selectively save the context of the software program to the nonvolatile memory;
    a context data recovery engine adapted to recover the saved context from the nonvolatile memory, the software program being adapted to resume its execution in the host processor from the recovered saved context upon software program boot up subsequent to a restart engine-initiated controller restart cycle;
    a watchdog timer, the watchdog timer being configured to timeout and generate an alert signal unless periodically reset; and
    a restart engine configured to initiate a controller restart cycle upon receiving the alert signal;
    wherein the software program is divided into a plurality of selected execution sequences, each of the execution sequences comprising a checkpoint at which the context of execution of the program is saved to the nonvolatile memory and the watchdog timer is reset to a pre-selected timeout value that is sufficiently large to avoid the watchdog timer lapsing before the software program reaches the next checkpoint through normal execution.

2. The controller of claim 1, wherein the processor and the controller are one of:
    formed together on a single chip integrated circuit;
    disposed on a single piece hybrid circuit; and
    disposed on a single electronic board.

3. The controller of claim 1, wherein the controller further comprises a hardware random number generator coupled to the processor, the hardware random number generator being configured to provide the processor with random encryption keys or random numbers.

4. The controller of claim 1, wherein the restart engine is configured to initiate a three phase controller restart cycle comprising a software reboot cycle, a hardware reset cycle and a power off cycle, the hardware reset cycle only being initiated upon failure of the software reboot cycle and the power off cycle only being initiated upon failure of the hardware reset cycle.

5. The controller of claim 1, further including a hardware random number generator.

6. The controller of claim 5, wherein the processor, the controller and the hardware random number generator are one of:
    formed together on a single chip integrated circuit;
    disposed on a single piece hybrid circuit; and
    disposed on a single electronic board.

7. The controller of claim 1, wherein the software program is configured to generate a first secret key and wherein the watchdog timer is further configured to retrieve a second secret key from an entry in a table and to terminate an execution of the software program if the first secret key does not match the second secret key.

8. The controller of claim 7, wherein the watchdog timer is further configured to allow the software program to resume execution if the first secret key matches the second secret key.

9. The controller of claim 7, wherein the watchdog timer is further configured to allow the software program to resume execution only if the first secret key matches the second secret key and the alert signal has not been generated.

10. The controller of claim 7, wherein the first and second secret keys are encrypted and wherein the watchdog tinier is further configured to decrypt the first and second encrypted secret keys before determining whether the first and second secret keys match.

11. The controller of claim 1, wherein the restart engine is further configured to selectively cut power off from the processor executing the software program.

12. The controller of claim 11, wherein the restart engine is further configured to power-on the processor for booting up the software program after a predetermined time-out subsequent to cutting power off.

13. The controller of claim 1, wherein the software program is divided into a plurality of execution sequences, each of the execution sequences being divided by a checkpoint at which respective first secret, keys are provided and wherein execution of each execution sequence is contingent at least upon a timely provision of the first secret key at a preceding checkpoint and a determination by the watchdog timer that the provided first secret key matches a corresponding second secret key retrieved by the watchdog timer.

14. The controller of claim 1, wherein the software program is divided into a plurality of selected execution sequences, each of the execution sequences comprising a checkpoint at which the context of execution of the program is saved.

* * * * *